United States Patent
Mitsuhashi et al.

(10) Patent No.: US 12,556,812 B2
(45) Date of Patent: Feb. 17, 2026

(54) IMAGING DEVICE, IMAGING METHOD, AND PROGRAM

(71) Applicant: SONY SEMICONDUCTOR SOLUTIONS CORPORATION, Kanagawa (JP)

(72) Inventors: Takuya Mitsuhashi, Kanagawa (JP); Akira Hosotani, Kanagawa (JP); Tetsuro Hashimoto, Kanagawa (JP); Syunji Nagao, Kanagawa (JP); Shinichi Sato, Kanagawa (JP); Takahiro Sakaguchi, Kanagawa (JP); Kazuhito Kobayashi, Kanagawa (JP); Hiroki Abasaki, Kanagawa (JP); Hiroaki Anai, Kanagawa (JP); Osamu Kobayakawa, Kanagawa (JP); Hideo Nomura, Kanagawa (JP)

(73) Assignee: SONY SEMICONDUCTOR SOLUTIONS CORPORATION, Kanagawa (JP)

( * ) Notice: Subject to any disclaimer, the term of this patent is extended or adjusted under 35 U.S.C. 154(b) by 18 days.

(21) Appl. No.: 18/576,758

(22) PCT Filed: Feb. 25, 2022

(86) PCT No.: PCT/JP2022/007793
§ 371 (c)(1),
(2) Date: Jan. 5, 2024

(87) PCT Pub. No.: WO2023/002660
PCT Pub. Date: Jan. 26, 2023

(65) Prior Publication Data
US 2024/0305882 A1    Sep. 12, 2024

(30) Foreign Application Priority Data

Jul. 20, 2021   (JP) .................. 2021-119952

(51) Int. Cl.
*H04N 23/661* (2023.01)
*H04N 23/60* (2023.01)
(Continued)

(52) U.S. Cl.
CPC ........ *H04N 23/662* (2023.01); *H04N 23/665* (2023.01); *H04N 23/667* (2023.01); *H04N 23/72* (2023.01); *H04N 23/90* (2023.01)

(58) Field of Classification Search
None
See application file for complete search history.

(56) References Cited

U.S. PATENT DOCUMENTS

2017/0054930 A1* 2/2017 Ohmaru ............. H10F 39/8023
2018/0241922 A1* 8/2018 Baldwin ................ H04N 23/45
(Continued)

FOREIGN PATENT DOCUMENTS

| JP | 2014075623 A | 4/2014 |
| JP | 2018-191248 A | 11/2018 |
| WO | 2018/159046 A1 | 9/2018 |

OTHER PUBLICATIONS

International Search Report and Written Opinion of PCT Application No. PCT/JP2022/007793, issued on May 24, 2022, 17 pages of ISRWO.

*Primary Examiner* — Paul M Berardesca
(74) *Attorney, Agent, or Firm* — CHIP LAW GROUP

(57) ABSTRACT

The present technology relates to an imaging device, an imaging method, and a program that enable different imaging elements to align timings at which settings are reflected. The imaging device includes a control unit that controls a second imaging element that captures an image at a lower frame rate than the frame rate of a first imaging element. In a case where a synchronization signal supplied from the first imaging element is received, the control unit determines whether or not the current frame is a frame to be decimated.

(Continued)

In a case where the control unit determines that the current frame is not a frame to be decimated, imaging is performed, and in a case where the control unit determines that the current frame is a frame to be decimated, drive for imaging is stopped. The present technology can be applied to an imaging device including a plurality of imaging elements, for example.

5 Claims, 25 Drawing Sheets

(51) Int. Cl.
  *H04N 23/667* (2023.01)
  *H04N 23/72* (2023.01)
  *H04N 23/90* (2023.01)

(56) References Cited

U.S. PATENT DOCUMENTS

2020/0236265 A1\* 7/2020 Kim .................... H04N 23/665
2021/0235010 A1\* 7/2021 Wallace ................ H04N 13/25

\* cited by examiner

*FIG. 18*

| MC-Mode | command |
|---|---|
| MC_OFF | 000 |
| MC_WIDE | 001 |
| MC_WIDE_MAIN | 010 |
| MC_MAIN_WIDE | 011 |
| MC_MAIN | 100 |
| MC_MAIN_TELE | 101 |
| MC_TELE_MAIN | 110 |
| MC_TELE | 111 |

| MC-Mode Register | LUT-Start | LUT-ctrl |
|---|---|---|
| MC_OFF(000) | OFF | - |
| MC_WIDE(001) | LUT-A | 1 loop |
| MC_WIDE_MAIN(010) | LUT-A | 1 loop |
| MC_MAIN_WIDE(011) | LUT-B | - |
| MC_MAIN(100) | OFF | - |
| MC_MAIN_TELE(101) | OFF | - |
| MC_TELE_MAIN(110) | OFF | - |
| MC_TELE(111) | OFF | - |

56-2

| MC-Mode Register | LUT-Start | LUT-ctrl |
|---|---|---|
| MC_OFF(000) | OFF | - |
| MC_WIDE(001) | OFF | - |
| MC_WIDE_MAIN(010) | LUT-B | 1 loop |
| MC_MAIN_WIDE(011) | LUT-A | 1 loop |
| MC_MAIN(100) | LUT-A | 1 loop |
| MC_MAIN_TELE(101) | LUT-B | 1 loop |
| MC_TELE_MAIN(110) | OFF | - |
| MC_TELE(111) | OFF | - |

56-3

| MC-Mode Register | LUT-Start | LUT-ctrl |
|---|---|---|
| MC_OFF(000) | OFF | - |
| MC_WIDE(001) | OFF | - |
| MC_WIDE_MAIN(010) | OFF | - |
| MC_MAIN_WIDE(011) | OFF | - |
| MC_MAIN(100) | OFF | - |
| MC_MAIN_TELE(101) | LUT-B | 1 loop |
| MC_TELE_MAIN(110) | LUT-A | 1 loop |
| MC_TELE(111) | LUT-A | 1 loop |

IMAGING DEVICE, IMAGING METHOD, AND PROGRAM

CROSS REFERENCE TO RELATED APPLICATIONS

This application is a U.S. National Phase of International Patent Application No. PCT/JP2022/007793 filed on Feb. 25, 2022, which claims priority benefit of Japanese Patent Application No. JP 2021-119952 filed in the Japan Patent Office on Jul. 20, 2021. Each of the above-referenced applications is hereby incorporated herein by reference in its entirety.

TECHNICAL FIELD

The present technology relates to an imaging device, an imaging method, and a program, and more particularly, to an imaging device, an imaging method, and a program designed to be capable of control in accordance with exposure conditions and mode change timing that are shared among a plurality of cameras, for example.

BACKGROUND ART

There are suggested techniques by which a plurality of imaging devices each capable of imaging is used to perform stereoscopic imaging, or simultaneously capture a plurality of images having different angles of view, for example.

There is a suggested technique by which it is possible to use a plurality of imaging devices more effectively by making the plurality of imaging devices synchronized in performing imaging, or causing each imaging device to perform imaging independently (see Patent Document 1, for example).

CITATION LIST

Patent Document

Patent Document 1: Japanese Patent Application Laid-Open No. 2018-191248

SUMMARY OF THE INVENTION

Problems to be Solved by the Invention

In a case where imaging is performed with a plurality of imaging devices, it is desired that changes in exposure conditions and modes will be reflected among a plurality of imaging devices without a shift in timing.

The present technology has been made in view of such circumstances, and is to enable synchronous changes in exposure conditions and modes among a plurality of imaging devices.

Solutions to Problems

A first imaging device according to one aspect of the present technology is an imaging device that includes a control unit that controls a second imaging element that captures an image at a lower frame rate than the frame rate of a first imaging element. In a case where a synchronization signal supplied from the first imaging element is received, the control unit determines whether or not the current frame is a frame to be decimated. In a case where the control unit determines that the current frame is not a frame to be decimated, imaging is performed, and in a case where the control unit determines that the current frame is a frame to be decimated, drive for imaging is stopped.

A first imaging method according to one aspect of the present technology is an imaging method that is implemented by an imaging device that includes a control unit that controls a second imaging element that captures an image at a lower frame rate than the frame rate of a first imaging element. In a case where a synchronization signal supplied from the first imaging element is received, the imaging device determines whether or not the current frame is a frame to be decimated. In a case where determining that the current frame is not a frame to be decimated, the imaging device performs imaging, and in a case where determining that the current frame is a frame to be decimated, the imaging device stops drive for imaging.

A first program according to one aspect of the present technology is a program to be executed by a computer that controls an imaging device that includes a control unit that controls a second imaging element that captures an image at a lower frame rate than the frame rate of a first imaging element. The program is designed to cause the computer to perform a process including the steps of: determining whether or not the current frame is a frame to be decimated, in a case where a synchronization signal supplied from the first imaging element is received; and performing imaging in a case where the current frame is determined not be a frame to be decimated, and stopping drive for imaging in a case where the current frame is determined to be a frame to be decimated.

A second imaging device according to one aspect of the present technology is an imaging device that includes: a first control unit that controls imaging that is performed by a first imaging element; a second control unit that controls imaging that is performed by a second imaging element; and a third control unit that outputs a command for instructing each of the first control unit and the second control unit to switch modes. The third control unit transmits, to the first control unit, the command including a timing at which setting by the command is reflected, and the third control unit transmits the command to the second control unit.

A second imaging method according to one aspect of the present technology is an imaging method that is implemented by an imaging device that includes a first control unit that controls imaging that is performed by a first imaging element, a second control unit that controls imaging that is performed by a second imaging element, and a third control unit that outputs a command for instructing each of the first control unit and the second control unit to switch modes. The imaging method includes: transmitting by the third control unit, the command including a timing at which setting by the command is reflected, to the first control unit; and transmitting by the third control unit the command to the second control unit.

A second program according to one aspect of the present technology is a program to be executed by a computer that controls an imaging device that includes a first control unit that controls imaging that is performed by a first imaging element, a second control unit that controls imaging that is performed by a second imaging element, and a third control unit that outputs a command for instructing each of the first control unit and the second control unit to switch modes. The program is designed to cause the computer to perform a process including the steps of: causing the third control unit to transmit, to the first control unit, the command including a timing at which setting by the command is reflected; and causing the third control unit to transmit the command to the second control unit.

In the first imaging device, the first imaging method, and the first program according to one aspect of the present technology, a control unit controls a second imaging element that captures an image at a lower frame rate than the frame rate of a first imaging element. In a case where receiving a synchronization signal supplied from the first imaging element, the first imaging device determines whether or not the current frame is a frame to be decimated. The first imaging device performs imaging in a case where determining that the current frame is not a frame to be decimated, but stops drive for imaging in a case where determining that the current frame is a frame to be decimated.

In the second imaging device, the second imaging method, and the second program according to one aspect of the present technology, a first control unit controls imaging that is performed by a first imaging element, a second control unit controls imaging that is performed by a second imaging element, and a third control unit outputs a command to instruct each of the first control unit and the second control unit to switch modes. The third control unit transmits, to the first control unit, a command including a timing to reflect the setting according to the command, and transmits the command to the second control unit.

Note that the imaging device may be an independent device or an internal block of one device.

Note that the program to be provided may be transmitted via a transmission medium or be recorded on a recording medium.

BRIEF DESCRIPTION OF DRAWINGS

FIG. 18 is a diagram showing an example of a table that is held by a control unit.

FIG. 19 is a diagram showing an example of tables that are held by sensors.

MODE FOR CARRYING OUT THE INVENTION

The following is a description of modes (hereinafter referred to as embodiments) for carrying out the present technology.

<Configuration of an Imaging Device>

The present technology can be applied to imaging devices, and therefore, a case where the present technology is applied to an imaging device is explained as an example in the description below.

Figure 1:
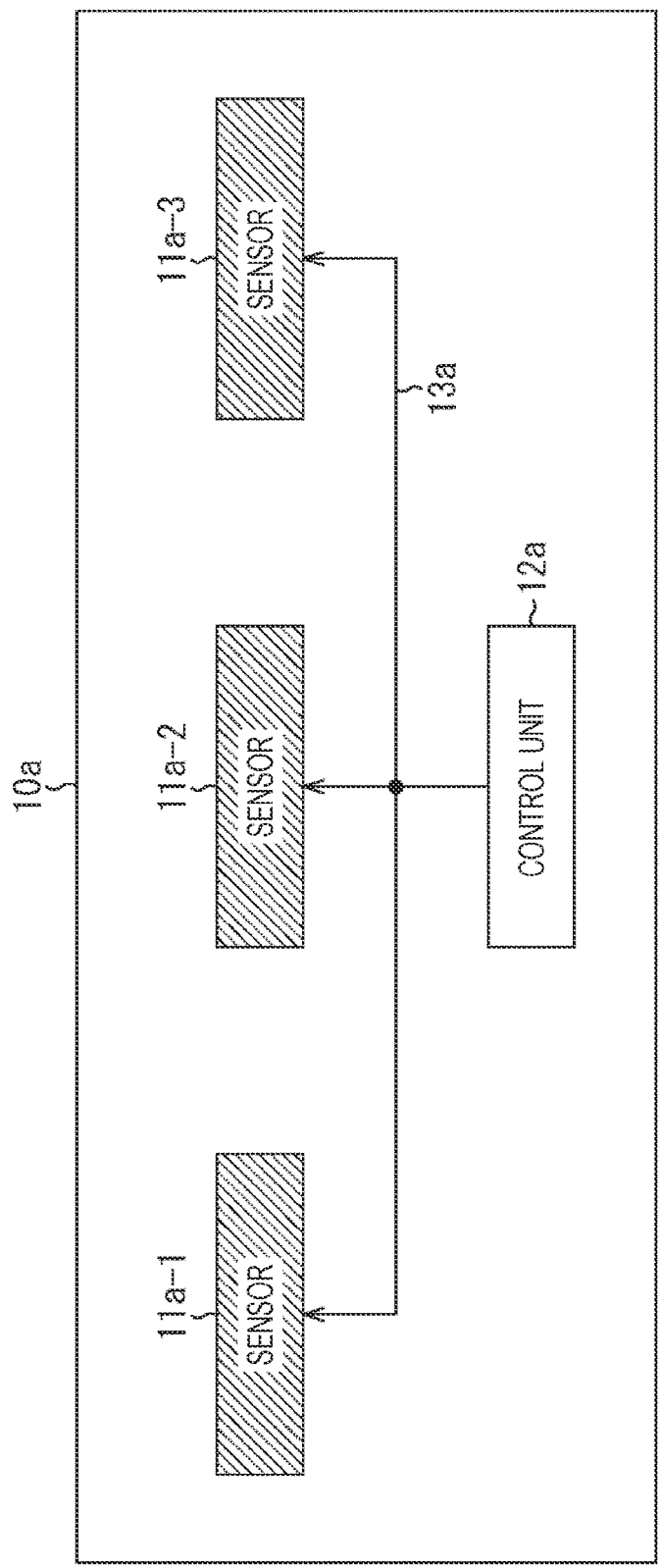
FIG. 1 is a diagram showing the configuration of an embodiment of an imaging device to which the present technology is applied.

FIG. 1 is a diagram showing the configuration of an embodiment of an imaging device to which the present technology is applied. An imaging device 10a illustrated in FIG. 1 includes a sensor 11a-1, a sensor 11a-2, a sensor 11a-3, a control unit 12a, and a signal line 13a.

The sensors 11a-1 to 11a-3 may be imaging elements such as charge coupled device (CCDs) or complementary metal oxide semiconductor (CMOS) sensors, for example. The imaging device 10a can be mounted on a smartphone, for example. In the description below, in a case where there is no need to distinguish the sensors 11a-1 to 11a-3 from one another, they are simply referred to as the sensors 11a. The other parts will be described in a similar manner.

Here, to explain an imaging device 10 as an example, a case where the sensors 11 are imaging elements (image sensors) such as CCDs or CMOS sensors is described as an example. However, the present technology can be applied to sensors 11 that are not imaging elements. For example, the sensors may be pressure sensors, temperature sensors, acceleration sensors, illuminance sensors, or the like.

As described later, according to the present technology, it is possible to acquire data by causing a plurality of sensors 11 to reflect, at desired timing, the settings for data acquisition. In the description below, a case where the sensors 11 are imaging elements is described as an example, and a case where the settings at a time of image data acquisition are reflected synchronously in a plurality of sensors 11 at desired timing is described as an example.

The sensor 11a-1 may be a wide sensor, the sensor 11a-2 may be a main sensor, and the sensor 11a-3 may be a tele-sensor. The wide sensor is a sensor that captures an image on the wide-angle end side, and captures an image in a relatively wide range. The tele-sensor is a sensor that captures an image on the telephoto end side, and captures an image in a relatively narrow range. The main sensor captures an image in a range between the wide-angle end and the telephoto end.

Note that an example in which the sensors 11a having different focal lengths with the wide-angle end, the main end, and the telephoto end are provided is described as an example herein, but the present technology can also be applied in a case where the plurality of sensors 11a captures images at the same focal length. For example, the present technology can also be applied in a case where a stereoscopic image is acquired by the plurality of sensors 11a performing imaging. For example, the present technology can also be applied in a case where a distance measurement image is acquired.

The control unit 12a processes signal from the sensors 11a by executing a predetermined application, for example, and outputs the signals to a processing unit in a subsequent stage (not illustrated in the drawing) or controls the sensors 11a. The control unit 12a may be an image signal processor (ISP).

The example illustrated in FIG. 1 (referred to as the example configuration 1) is a configuration in which each of the sensors 11a-1 to 11a-3 operates as a master, and is a configuration called a stand-alone or the like.

In FIG. 1, the masters are indicated by hatching.

The sensors 11a and the control unit 12a are connected by, for example, the signal line 13a that conducts communication by the inter-integrated circuit (I2C) method. In the example configuration 1 illustrated in FIG. 1, each sensor 11a is designed to receive a control command from the control unit 12a. Each sensor 11a is also designed to generate a synchronization signal and the like.

Figure 2:
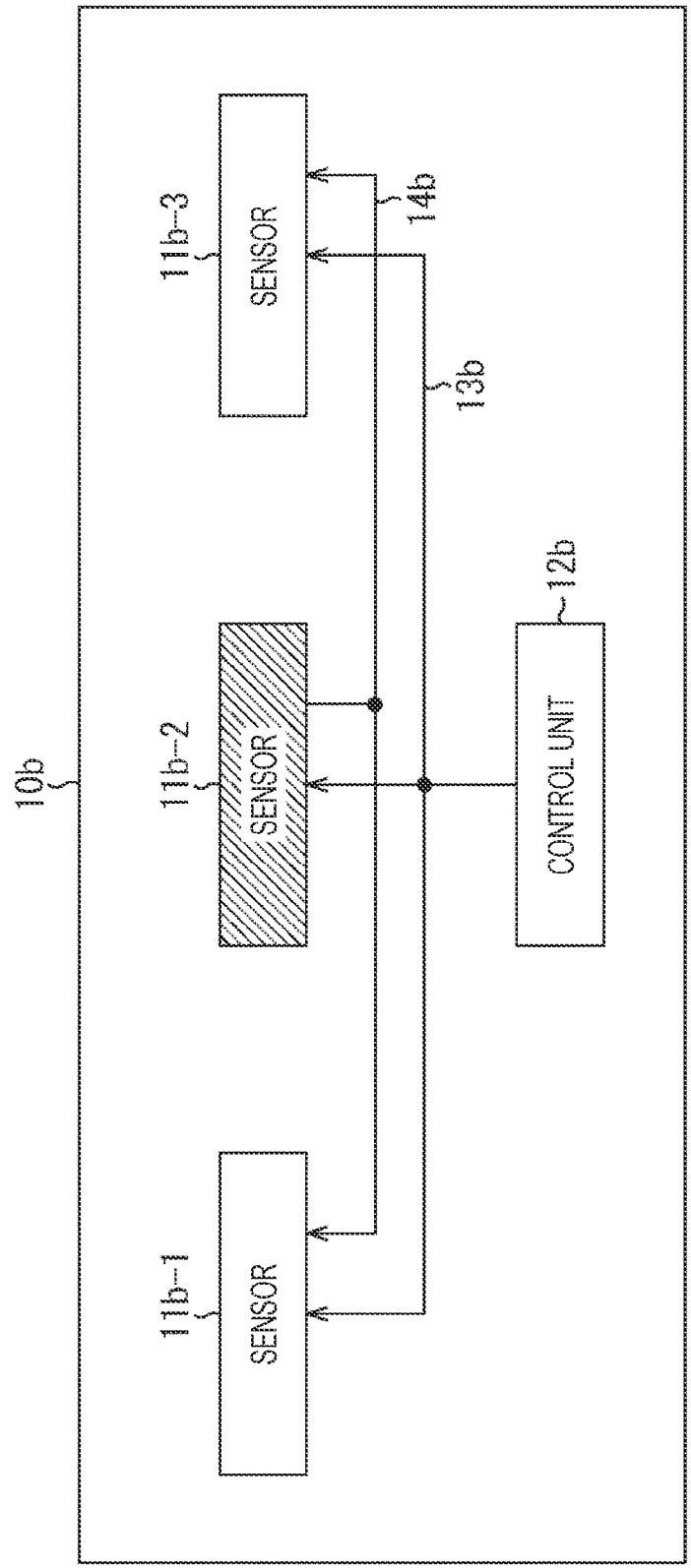
FIG. 2 is a diagram illustrating an example configuration of an imaging device.
Figure 3:
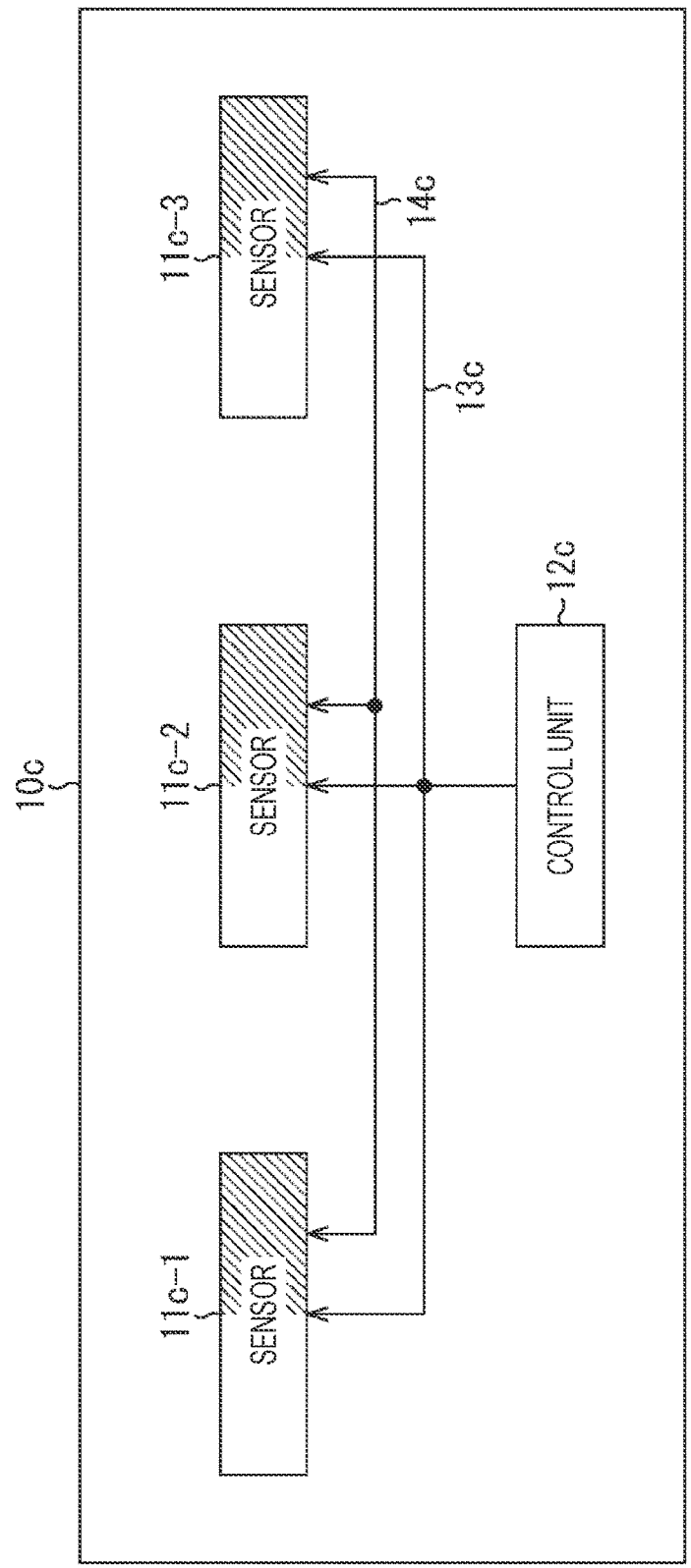
FIG. 3 is a diagram illustrating an example configuration of an imaging device.
Figure 4:
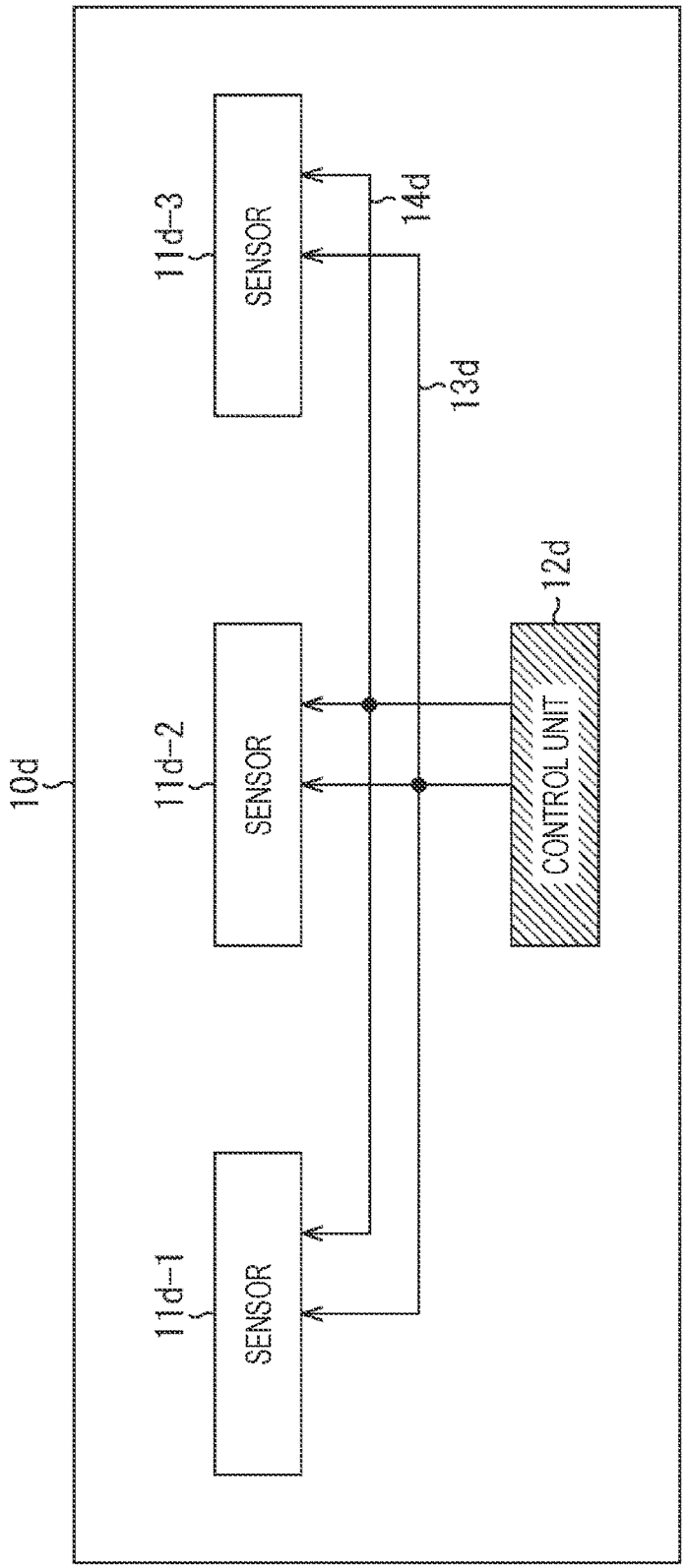
FIG. 4 is a diagram illustrating an example configuration of an imaging device.

The imaging device 10 can also have a configuration of the example configurations 2 to 4 illustrated in FIGS. 2 to 4.

FIG. 2 is a diagram illustrating an example configuration of an imaging device 10b having the example configuration 2. In the example configuration 2 illustrated in FIG. 2, a sensor 11b-2 indicated by hatching is set as a master, and a sensor 11b-1 and a sensor 11b-3 are set as slaves.

In the case of the configuration in which one sensor 11b of the sensors 11b-1 to 11b-3 is set as a master, and the other sensors 11b are set as slaves, a synchronization signal generated by the master sensor 11b-2 is supplied to the slave sensor 11b-1 and the slave sensor 11b-3. A signal line 14b for supplying the synchronization signal is provided between the sensors 11b.

FIG. 3 is a diagram illustrating an example configuration of an imaging device 10c having the example configuration 3. In the example configuration 3 illustrated in FIG. 3, sensors 11c-1 to 11c-3 each have a function of switching between a master and a slave, and operate as a master or a slave. In a case where one of the sensors 11c-1 to 11c-3 operates as a master, the other sensors 11c operate as slaves.

A synchronization signal generated by the sensor 11c operating as the master is supplied to the slave sensors 11c via a signal line 14c. A command from a control unit 12c is supplied to the sensors 11c via a signal line 13c.

FIG. 4 is a diagram illustrating an example configuration of an imaging device 10d having the example configuration 4. In the example configuration 4 illustrated in FIG. 4, sensors 11d-1 to 11d-3 operate as slaves, and a control unit 12d operates as a master.

Since the control unit 12d operates as the master, the control unit 12d generates a synchronization signal, and supplies the synchronization signal to each sensor 11d via a signal line 14d. A command from the control unit 12d is supplied to the sensors 11d via a signal line 13d.

Although the description will be continued below on the assumption that the imaging device 10 includes the three sensors 11, which are sensors 11-1 to 11-3 formed with imaging elements, the present technology can also be applied in a case where the imaging device includes two or three or more sensors 11.

As for the configuration of the imaging device 10, the present technology described below can be applied to any of the example configurations 1 to 4 illustrated in FIGS. 1 to 4. In the description below, a sensor 11 that operates as a master will be referred to as a sensor 11M, and a sensor 11 that operates as a slave will be referred to as a sensor 11S.

<Configurations of Sensors>

Figure 5:
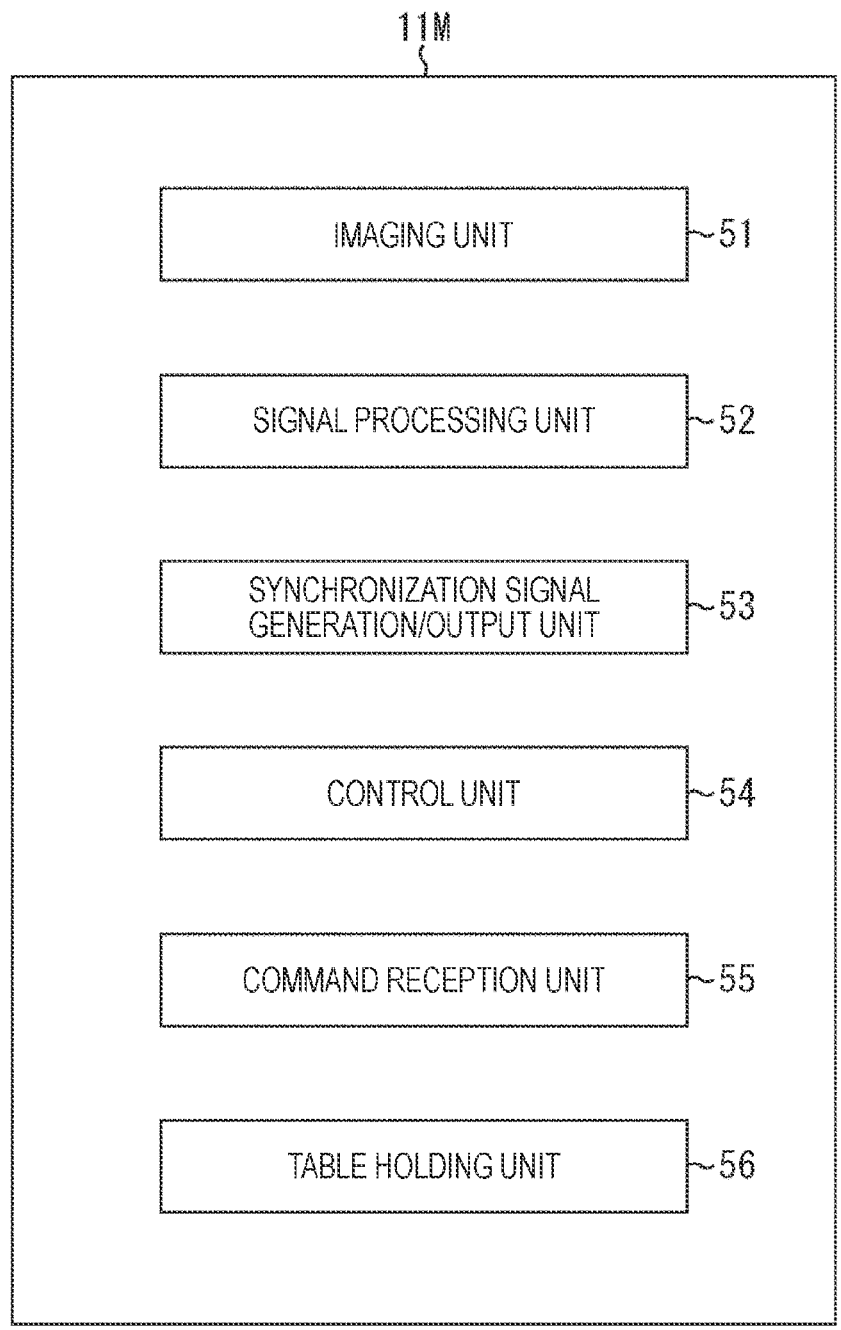
FIG. 5 is a diagram illustrating an example configuration of a sensor.
Figure 6:
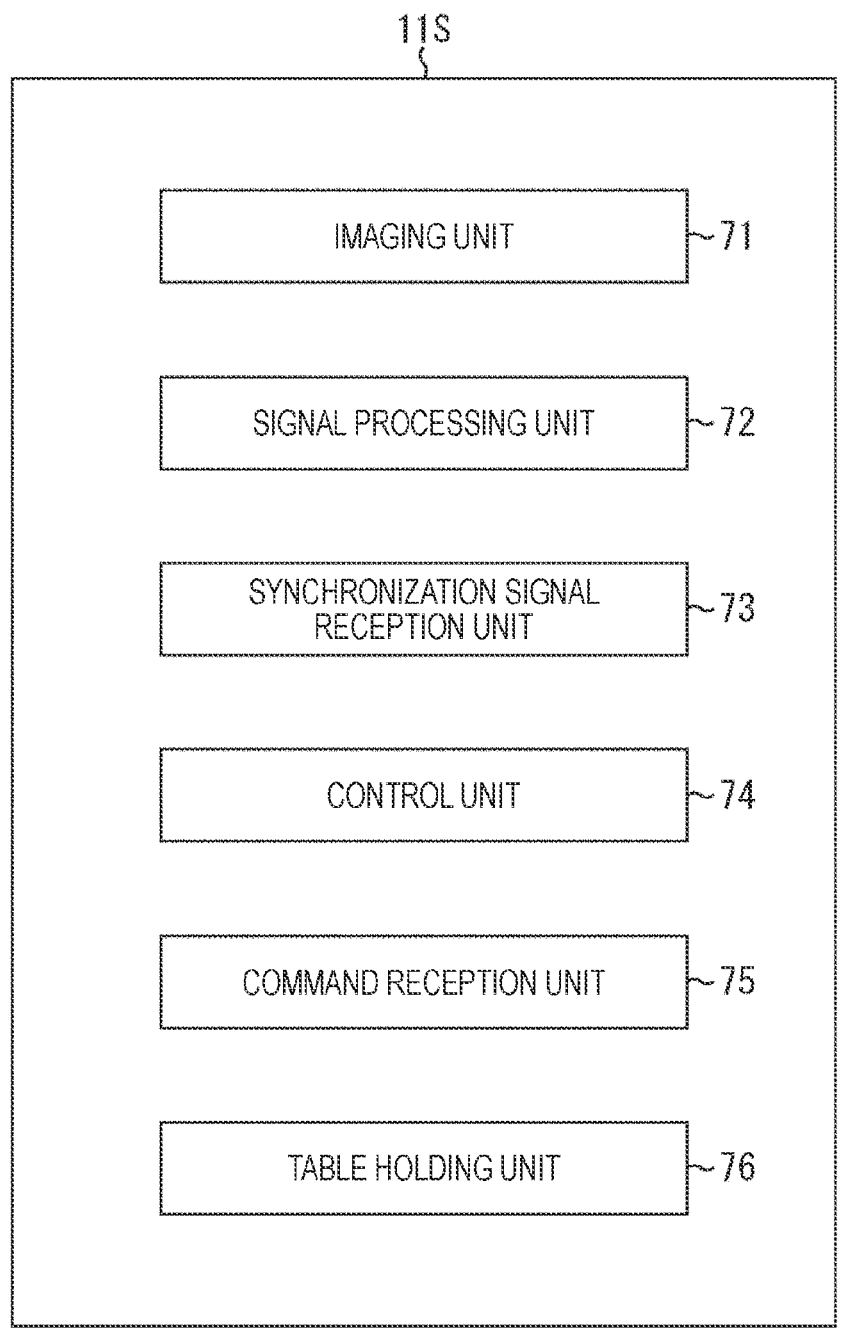
FIG. 6 is a diagram illustrating an example configuration of a sensor.

FIGS. 5 and 6 are diagrams illustrating example configurations of sensors 11.

FIG. 5 is a diagram illustrating an example configuration of a sensor 11M that operates as a master. The sensor 11M includes an imaging unit 51, a signal processing unit 52, a synchronization signal generation/output unit 53, a control unit 54, a command reception unit 55, and a table holding unit 56.

The imaging unit 51 includes an imaging element and a lens, receives reflected light from the object, and outputs a signal corresponding to the received light amount to the signal processing unit 52. The signal processing unit 52 performs processing such as defect correction, noise reduction, and high dynamic range synthesis processing (HDR) on the input signal, and outputs the processed signal to the control unit 12 (FIG. 1). Note that the function of processing a signal output from the imaging unit 51 may be divided between the signal processing unit 52 and the control unit 12 (FIG. 1), or may be assigned only to one of them.

The synchronization signal generation/output unit 53 generates a synchronization signal, and supplies the synchronization signal to the signal processing unit 52. The synchronization signal generated by the synchronization signal generation/output unit 53 is also supplied to the slave-side sensors 11S. The synchronization signal is a vertical synchronization signal, for example.

The control unit 54 controls the respective components in the sensors 11S in a mode that is set on the basis of a signal from the outside, such as a control signal from a control unit 12b (FIG. 2), for example.

The command reception unit 55 receives a command from the control unit 12b (FIG. 2), for example. The table holding unit 56 holds a table in which codes to be transmitted as commands are associated with settings. As described later, commands are transmitted and received as codes formed with short data strings, and the side of the sensors 11S refers to the table held in the table holding unit 56. Thus, parameters in a predetermined mode are set.

FIG. 6 is a diagram illustrating an example configuration of a sensor 11S that operates as a slave. The sensor 11S includes an imaging unit 71, a signal processing unit 72, a synchronization signal reception unit 73, a control unit 74, a command reception unit 75, and a table holding unit 76.

The imaging unit 71, the signal processing unit 72, the control unit 74, the command reception unit 75, and the table holding unit 76 of the sensor 11S operating in a slave mode have configurations and perform processes basically similar to those of the imaging unit 51, the signal processing unit 52, the control unit 54, the command reception unit 55, and the table holding unit 56 of the sensor 11M operating in a master mode. The synchronization signal reception unit 73 receives a synchronization signal from the sensor 11M on the master side, and the signal processing unit 72 performs processing on the basis of the synchronization signal received by the synchronization signal reception unit 73.

<Example Configuration of the Control Unit>

Figure 7:
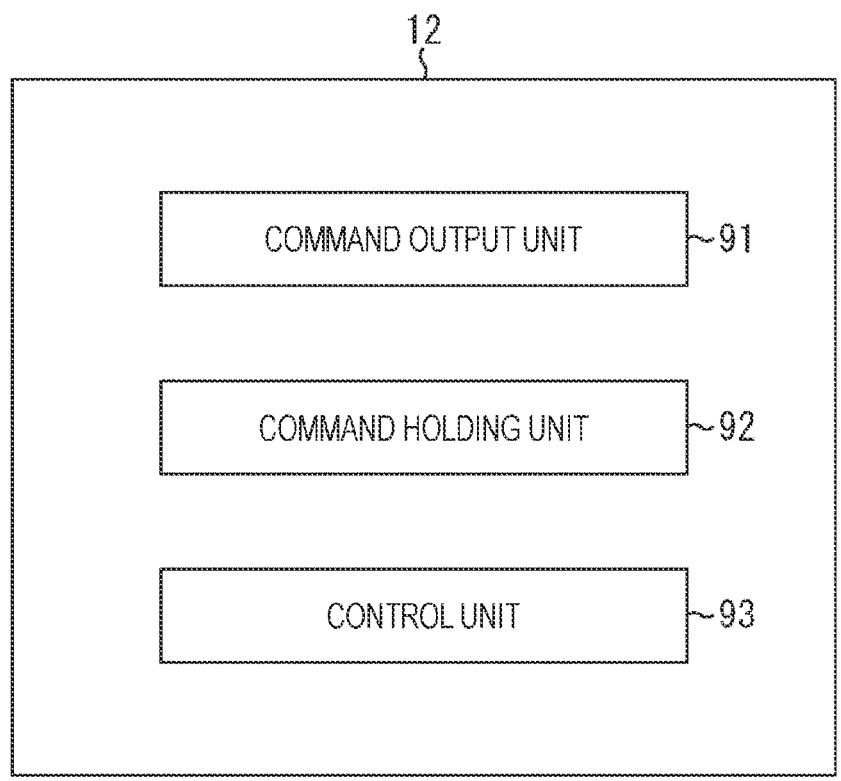
FIG. 7 is a diagram illustrating an example configuration of a control unit.

FIG. 7 is a diagram illustrating an example configuration of the control unit 12. The control unit 12 includes a command output unit 91, a command holding unit 92, and a control unit 93. A command having a short data string is held in the command holding unit 92. In accordance with an instruction from the control unit 93, the command output unit 91 reads the command held in the command holding unit 92, and outputs the command to the corresponding sensor 11.

As in the example configuration 4 illustrated in FIG. 4, in a case where the control unit 12 operates as the master, the control unit 12 also has a function of generating and outputting a synchronization signal.

<Synchronization of AE Control>

Synchronization of auto exposure (AE) control to be performed by the imaging device 10 is described. To clarify the difference between synchronization of AE control to which the present technology is applied and synchronization of conventional AE control, synchronization of conventional AE control is first described with reference to FIG. 8.

Figure 8:
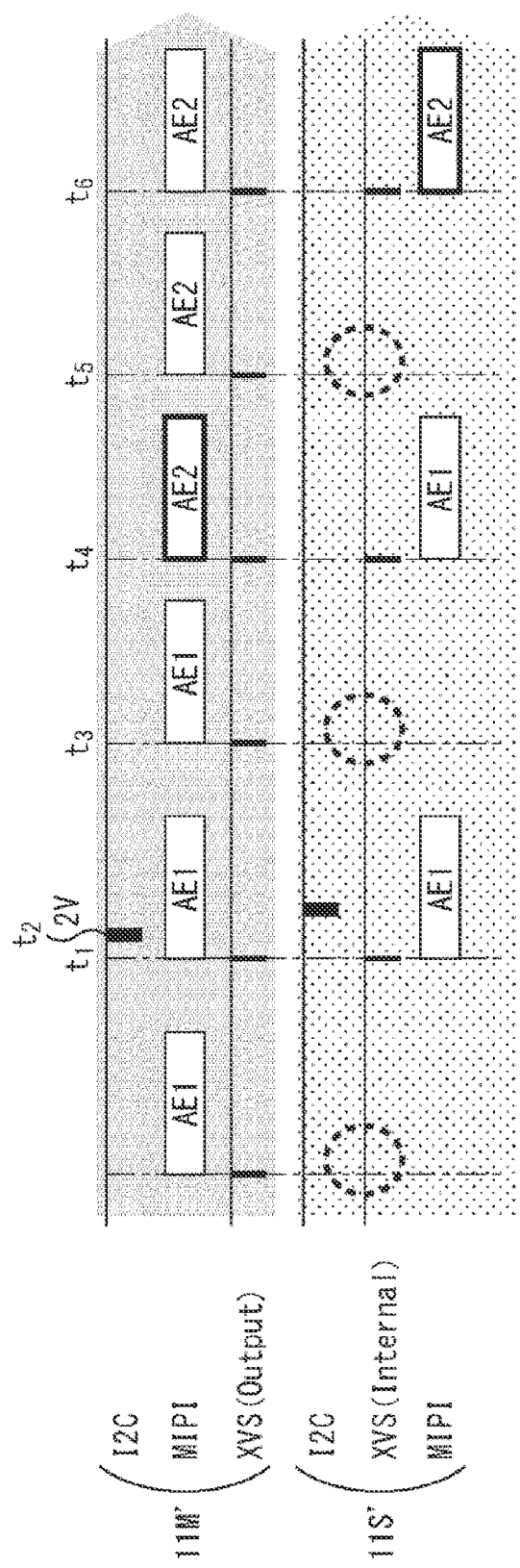
FIG. 8 is a diagram for explaining timing to change exposure conditions.

The upper diagram in FIG. 8 illustrates an operation of a sensor 11M' that operates as a master (to distinguish from the sensor 11M to which the present technology is applied, the conventional sensor 11M' is denoted by a reference numeral with a prime, and the other components will be denoted in a similar manner), and the lower diagram in FIG. 8 illustrates an operation of a sensor 11S' that operates as a slave.

In the drawing, I2C represents a command supplied from a control unit 12' to the sensor 11' via a signal line 13'. A mobile industry processor interface (MIPI) indicates an output of a captured image (frame). One frame in the drawing is represented by a rectangle, AE1 and AE2 written in the rectangles indicate exposure conditions such as exposure time and gain, and AE1 and AE2 represent different exposure conditions.

XVS (Output) represents a synchronization signal transmitted from the master-side sensor 11M' to the slave-side sensor 11S' via a signal line 14', and XVS (Internal) represents a synchronization signal that is internally generated using a synchronization signal received by the slave-side sensor 11S' as a control command.

At time t1, the sensor 11M' generates a synchronization signal. This synchronization signal is also supplied to the slave-side sensor 11S'. Here, a case where the system is a 2 V system, and the slave-side sensor 11S' generates one frame in a vertical synchronization period (2 V) in which the master-side sensor 11M' generates two frames is described as an example.

At time t4 (two frames later), the sensor 11S' generates a synchronization signal based on the synchronization signal received at time t1. Depending on the specification, the settings can be designed so that the generation is performed one frame later, or generation is performed three frames later. Here, to simplify the description, it is assumed that the settings are designed to perform the generation zero frame later, and synchronous processing is performed by generating a synchronization signal also on the side of the sensor 11S' at the timing when the sensor 11S' receives the synchronization signal from the sensor 11M'.

At time t2, the sensor 11M' and the sensor 11S' receive a command from the control unit 12' (not shown in FIG. 8). Note that a command is transmitted from the control unit 12' to each of the sensor 11M' and the sensor 11S'. Specifically, the sensor 11M' receives the command at time t2, and the sensor 11S' receives the command after a short time has elapsed since time t2.

Although a case where both the sensor 11M' and the sensor 11S' receive a command in a period (within one frame) between the synchronization signal generated at a predetermined time and the synchronization signal generated next is described herein as an example, there is a possibility that the sensor 11M' and the sensor 11S' will be unable to receive a command within one frame in some situation as described later. Even in such a case, it is possible to provide a mechanism with which a process according to a command as described later is reflected at predetermined timing.

Here, it is assumed that the command received by each of the sensor 11M' and the sensor 11S' at time t2 is a command related to AE control. It is assumed herein that the command is to change AE1 to AE2.

At time t3, the sensor 11M' generates a synchronization signal. This synchronization signal is also supplied to the slave-side sensor 11S', but the sensor 11S' does not receive the synchronization signal and does not perform a process of internally generating a synchronization signal.

As described above, the slave-side sensor 11S' is set in a mode for capturing one frame while the master-side sensor 11M' captures two frames. In a case where a difference is set between the frame rate of the master-side sensor 11M' and the frame rate of the slave-side sensor 11S' in this manner, synchronization signals are decimated or multiplied in the slave-side sensor 11S'.

In the description below, a mode for generating (outputting) a frame for each synchronization signal will be referred to as a normal mode, and a mode for capturing a smaller number of frames than the number of frames to be captured in the normal mode will be referred to as a decimation mode.

Since the slave-side sensor 11S' is in the decimation mode, the synchronization signal generated at time t3 is decimated.

At time t4, the sensor 11M' generates a synchronization signal, and also supplies the synchronization signal to the sensor 11S'. The sensor 11S' accepts the supplied synchronization signal as a control command, and executes a process based on the control command.

At time t4, to process the second synchronization signal generated at a point of time later than time t2 when the master-side sensor 11M' has received a command, the master-side sensor 11M' starts a process based on the received command. That is, the exposure condition is changed to AE2, and imaging is performed on the basis of the parameters set under the exposure condition AE2.

In the sensor 11S', on the other hand, at the point of time t4, the first synchronization signal is processed as a control command starting from a point of time after the command is received, or the first synchronization signal is processed in the sensor 11S'. Therefore, control based on the command received at time t2, which is control for performing imaging after switching the exposure condition from AE1 to AE2, is not performed in this case. Accordingly, at time t4, the sensor 11S' performs an imaging process with parameters based on the exposure condition AE1.

After that, the slave-side sensor 11S' decimates the synchronization signal received at time t5, and performs an imaging process on the basis of the synchronization signal received at time t6. Since the synchronization signal processed at time t6 is the second synchronization signal after receipt of a command, control based on the command is started at time t6. That is, at time t6, the sensor 11S' switches the exposure condition from AE1 to AE2, and performs imaging on the basis of the parameters set under the exposure condition A2.

In such a case, at time t4, imaging is performed under AE2-based control on the side of the sensor 11M', and imaging is performed under AE1-based control on the side of the sensor 11S'. That is, in this case, the sensor M' and the sensor S' perform imaging on the basis of different exposure conditions. For example, in a case where images respectively captured by the sensor 11M' and the sensor 11S' are combined to generate a new image, if images captured in different settings are combined, there is a possibility that the combined image might be broken.

Control for preventing settings based on a received command from being reflected at different timings but causing the settings to be simultaneously reflected in this manner is described below with reference to FIG. 9.

<Synchronization of AE Control to which the Present Technology is Applied>

Figure 9:
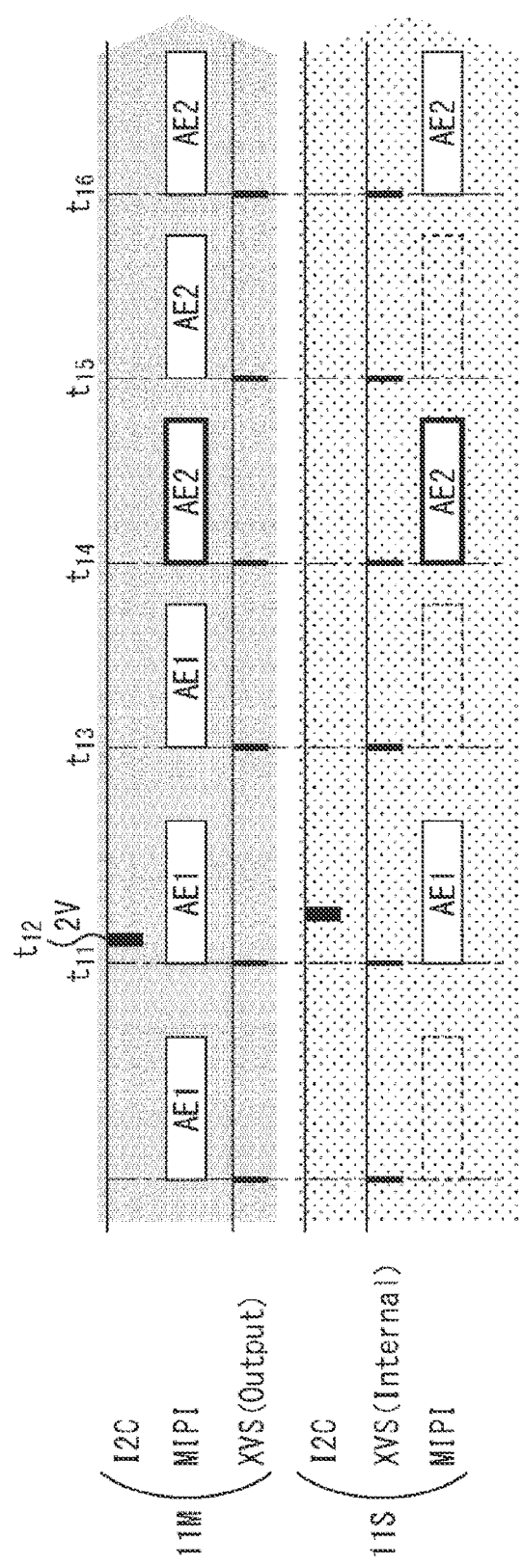
FIG. 9 is a diagram for explaining a process of aligning the timing to change exposure conditions.

FIG. 9 is a diagram for explaining synchronization of AE control to which the present technology is applied. The same components as those in FIG. 8 are illustrated in the same manner, and explanation of them is not repeated herein as appropriate.

The sensor 11M generates a synchronization signal at each of times t11, t13, t14, t15, and t16, and supplies the synchronization signals to the sensor 11S. The sensor 11M generates a synchronization signal with the synchronization signal generation/output unit 53 (FIG. 5), supplies the synchronization signal to the signal processing unit 52, and also supplies the synchronization signal to the slave-side sensor 11S.

At each of times t11, t13, t14, t15, and t16, the sensor 11M captures an image through processing by the imaging unit 51, the signal processing unit 52, and the control unit 54 of the sensor 11M, on the basis of a synchronization signal and the set exposure condition AE1, and outputs the captured image to a processing unit (not shown in the drawing) in a subsequent stage.

The synchronization signal reception unit 73 of the slave-side sensor 11S receives a synchronization signal from the sensor 11M at each of times t11, t13, t14, t15, and t16, and generates an internal synchronization signal. The sensor 11S does not decimate a synchronization signal even if the synchronization signal corresponds to the synchronization signal to be decimated described above with reference to FIG. 8, but generates a synchronization signal to be used internally, and supplies the synchronization signal to the signal processing unit 72.

The signal processing unit 72 determines whether or not the synchronization signal corresponds to the synchronization signal to be decimated. In a case where it is determined that the synchronization signal does not correspond to the synchronization signal to be decimated, an imaging process is performed, and a process of outputting a frame is performed. In a case where the signal processing unit 72 determines that the synchronization signal corresponds to the synchronization signal to be decimated, on the other hand, the imaging process is not performed. In this case, the reception of the synchronization signal is processed, but the driving related to the imaging process is stopped, and outputting of an image is stopped.

That is, the signal processing unit 72 determines whether or not the frame is a frame to be decimated, the drive for imaging is stopped in the case of a frame to be decimated, and imaging is performed in the case where a frame not to be decimated.

At time t12, a command from the control unit 12 is received by each of the sensor 11M and the sensor 11S. It is assumed that the command is an instruction to change the exposure condition from AE1 to AE2. On the side of the sensor 11M, the exposure condition is switched from AE1 to AE2 by the signal processing unit 52 at the point of time t14 (generation of the second synchronization signal) two frames later, and an imaging process is performed by the imaging unit 51.

On the side of the sensor 11S, the command received at time t2 is reflected two frames later (the second synchronization signal). After receiving the command, the sensor 11S receives (internally generates) the first synchronization signal at time t13, and receives (internally generates) the second synchronization signal at time t14.

On the side of the sensor 11S, when the first synchronization signal is received (time t13), the imaging process is stopped as described above, but the synchronization signal is processed as received. Accordingly, at the point of time (time t14) when the second synchronization signal is received, the settings of the command are reflected, the exposure condition is switched from AE1 to AE2, and imaging under the exposure condition AE2 is performed.

At time t14, imaging under the exposure condition AE2 is performed in the master-side sensor 11M, and imaging under the exposure condition AE2 is also performed in the slave-side sensor 11S. As described above, even in a case where a difference is set between the frame rate of the master-side sensor 11M and the frame rate of the slave-side sensor 11S, it is possible to perform simultaneous AE control in accordance with control commands transmitted from the control unit 12 at substantially the same time.

Figure 10:
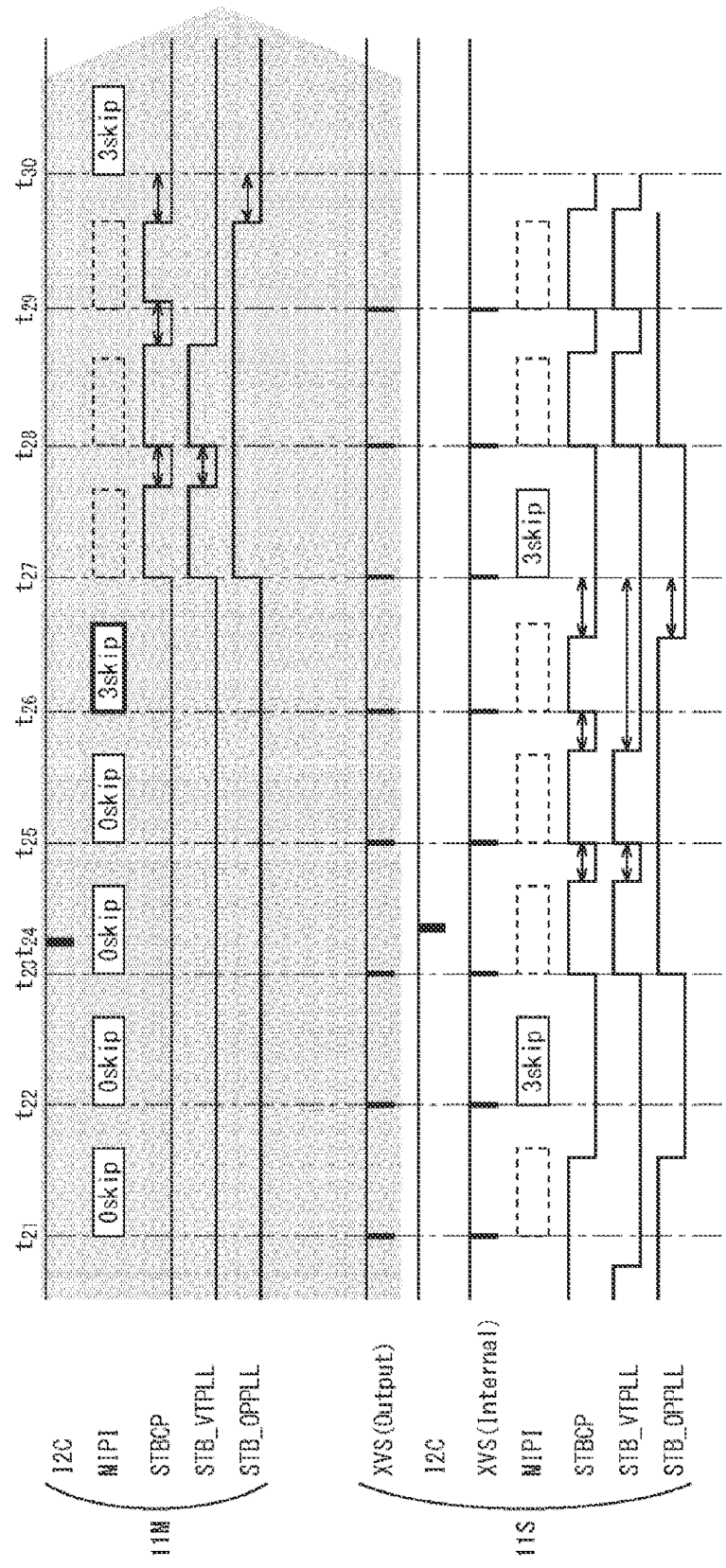
FIG. 10 is a diagram for explaining a power saving mode.

In a case where the frame rates are adjusted by stopping the imaging process in this manner, power consumption can be lowered. This aspect is described below with reference to FIG. 10.

Between time t21 and time t26, the sensor 11M performs imaging in a 0-skip mode (normal mode) in which frames are not decimated, and the sensor 11S performs imaging in a 3-skip mode (decimation mode) in which three frames are decimated.

After performing an image process at time t22, the sensor 11S stops the imaging process for three frames after that. As described above with reference to FIG. 9, the period in which the imaging process is stopped is a period in which, in a case where a synchronization signal corresponding to a synchronization signal to be decimated is received, the synchronization signal is processed as received (a synchronization signal is internally generated), but the imaging process is stopped.

During the period in which imaging is stopped, driving can be stopped for a portion for which driving is controlled by a standby control signal STBCP of an analog circuit, a portion for which driving is controlled by a PLL control signal STB VTPLL of an imaging control clock, and a portion for which is driving is controlled by a PLL control signal STB OPPLL of an MIPI control clock.

In a case where these control signals are High, driving of the corresponding portions is stopped. These signals can be stopped during a period in which imaging is stopped, or, in the case of the example illustrated in FIG. 10, during a period equivalent to three synchronization signals. However, to prepare for a case where a command is received, for example, these signals are set to a Low (ON) state as necessary for a predetermined period equivalent to three synchronization signals.

As described above, during the period in which the drive for imaging is stopped, the portion to be controlled by a standby control signal of an analog circuit or a PLL control signal can be put into an off-state, and thus, power consumption can be lowered. In a case where the period during which the drive for imaging is stopped is set as a low power consumption mode, it is possible to clarify the time at which the mode can be switched to the low power consumption mode according to the present technology, and thus, low power consumption is realized.

At time t24, the sensor 11M receives, from the control unit 12, a command to transition from the 0-skip mode to the 3-skip mode. The sensor 11M switches to the 3-skip mode (from the normal mode to the decimation mode) from time t26. As a result, in the sensor 11M, at time t27, time t28, and time t29, the drive for imaging is stopped, and no frames are output.

By setting the period during which the drive for imaging is stopped in the master-side sensor 11M as the low power consumption mode, and setting the control signal STBCP, the PLL control signal STB VTPLL, and the PLL control signal STB OPPLL to an off-state as described above, it is possible to stop the driving of the corresponding portions, and lower the power consumption.

That is, the present technology can also be applied in a case where the master-side sensor 11M is in the decimation mode, and the sensor 11M can be designed to switch to the low power consumption mode. In this case, power consumption in the master-side sensor 11M can also be lowered, and power consumption in the imaging device 10 can be lowered accordingly.

<Notification of Communication Completion Timing>

Figure 11:
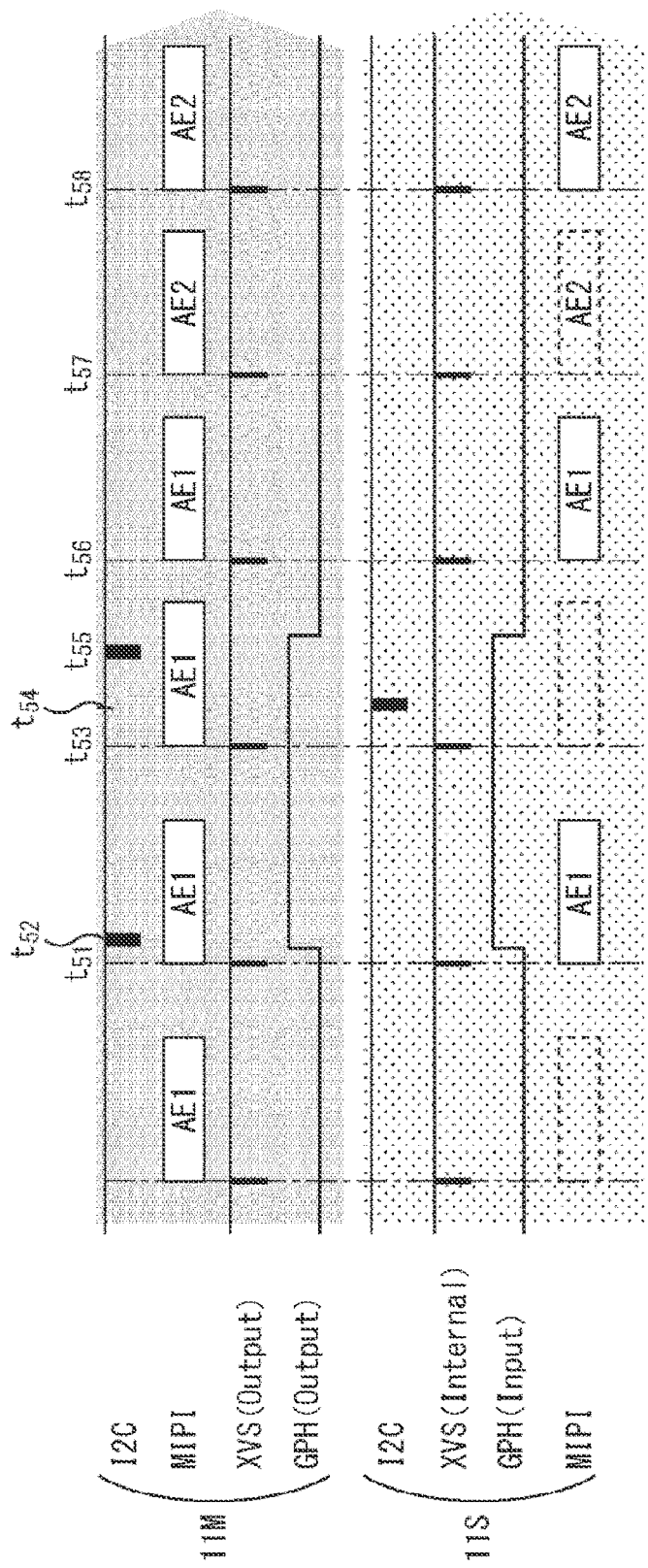
FIG. 11 is a diagram for explaining an additional function for aligning timings to change exposure conditions.

Referring now to FIG. 11, an operation of the imaging device 10 to which a function of sending a notification of communication completion timing is further added is described.

As illustrated in FIG. 11, a communication synchronization function is used as a function for aligning timings of communication completion. FIG. 11 is a diagram in which a communication synchronization signal of a communication synchronization function is added to FIG. 9. In the drawing, the communication synchronization signal is referred to as GPH.

At time t52, the sensor 11M receives, from the control unit 12, a command to switch the exposure condition from AE1 to AE2. If the communication synchronization function is not present in the sensor 11M, the settings in this command, which are the parameters, are reflected from time t56 when the second synchronization signal is generated.

It is assumed that the side of the sensor 11S receives a command to switch the exposure condition from AE1 to AE2 at time t54, which is later than time t52, for some reason. Time t54 is a point of time later than time t53, and time t53 is a point of time at which the first synchronization signal is generated after the command is issued at time t52.

As described above with reference to FIG. 9, the sensor 11S also processes a synchronization signal corresponding to a synchronization signal to be decimated, so that the timing at which a command is reflected is controlled so as not to deviate from the timing at which the command is reflected on the side of the sensor 11M.

If the communication synchronization function is not present, in a case where time t54 at which a command is received on the side of the sensor 11S is later than time t53 at which the first synchronization signal is processed, as illustrated in FIG. 11, the synchronization signal at time t53 is not counted as the synchronization signal for the timing to reflect the command.

In such a case, the side of the sensor 11S processes the first synchronization signal at time t56, determines that the second synchronization signal has been processed at time t57, and reflects the command settings at time t57. In a case where the communication synchronization function is not present as above, AE switching is performed at time t56 on the side of the sensor 11M, and AE switching is performed at time t57 on the side of the sensor 11S. As a result, AE switching is performed at different timings.

In a case where the timings at which a command is received greatly differ as above, there is a possibility that the timings at which the settings based on the received command are reflected will differ. To avoid such a situation, the communication synchronization function may be added to the configuration.

When (the head of) a command is received on the side of the sensor 11M at time t52, the communication synchronization signal is put into a High state. Since the communication synchronization signal is also supplied from the sensor 11M to the sensor 11S, the communication synchronization signal is also put into the High state at time t52 on the side of the sensor 11S.

At time t55, when the sensor 11M receives, from the control unit 12, a command to put the communication synchronization signal into a Low state, the communication synchronization signal is set to Low. Since a signal indicating that the communication synchronization signal is set to Low is also supplied to the slave-side sensor 11S, the communication synchronization signal is also set to Low on the side of the sensor 11S at time t55.

On the side of the sensor 11S, the command for which reception is completed in a case where this communication synchronization signal is in the High state is treated as a command for which reception is completed at a point where the communication synchronization signal is set to Low, so that, even if the command is received at different timings, which are time t52 and time t54, the command can be treated as a command for which reception is completed at time t55. That is, in the case of the example illustrated in FIG. 11, both the command for which reception is completed on the side of the sensor 11S at time t52 and the command for which reception is completed on the side of the sensor 11M at time t54 are regarded as a command for which reception is completed at time t55, and are handled in the sensor 11M and the sensor 11S, respectively.

As the process of aligning the timings at which a command is received is included as above, even in a case where the timing of reception of a command greatly differs between the sensors 11, the settings based on the command can be reflected at the same timing.

In the example illustrated in FIG. 11, in the sensor 11M, the command for which reception is completed at time t52 is treated as a command for which reception is completed at time t55, so that the first synchronization signal is processed at time t56, the second synchronization signal is processed at time t57, the exposure condition is switched from AE1 to AE2 at time t57, and an imaging process is then performed.

In the sensor 11S, the command for which reception is completed at time t54 is treated as a command for which reception is completed at time t55, so that the first synchronization signal is processed at time t56, the second synchronization signal is processed at time t57, the exposure condition is switched from AE1 to AE2 at time t57, and an imaging process is then performed.

Accordingly, at time t57, both the sensor 11M and the sensor 11S perform an imaging process based on the exposure condition AE2. Note that, in the sensor 11S, the frame to be captured at time t57 corresponds to a frame to be decimated, and therefore, the drive for imaging is stopped. However, according to the present technology, even at the timing of such a frame to be decimated, the exposure condition can be switched, and AE can be switched in synchronization with another sensor 11.

Such a communication synchronization function, or, in other words, a function of starting a process based on a command at the same timing regardless of command reception timings may be added to the configuration.

<Process at a Time of Mode Change>

A process to be performed by the imaging device 10 at a time of mode change is now described. To clarify the difference between the process at a time of mode change to which the present technology is applied and a conventional process at a time of mode change, the conventional process at a time of mode change is first described with reference to FIG. 12.

Mode change includes, for example, a case where the angle of view is changed, a case where the imaging mode is changed to a high dynamic range (HDR) imaging mode, and the like.

Figure 12:
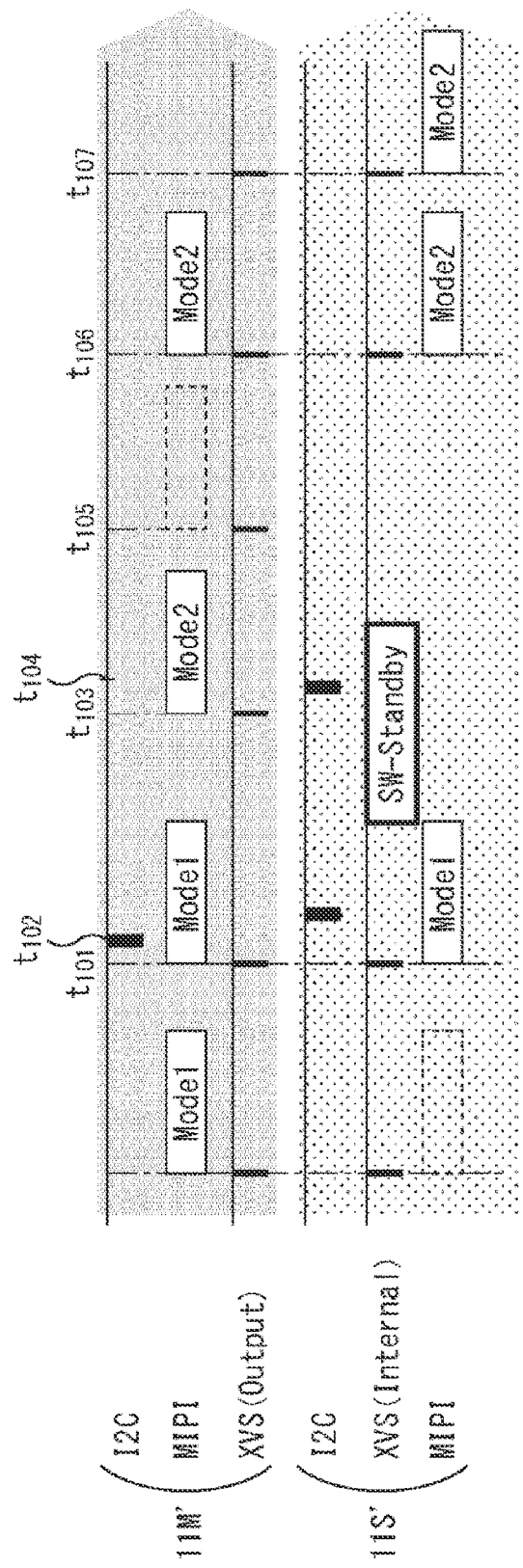
FIG. 12 is a diagram for explaining timings to switch modes.

The upper diagram in FIG. 12 illustrates an operation of the sensor 11M' operating as the master, and the lower diagram in FIG. 12 illustrates an operation of the sensor 11S' operating as a slave. At time t101, the sensor 11M' and the sensor 11S' perform imaging in Mode 1.

At time t102, a command to switch mode from Mode 1 to Mode 2 is transmitted from the control unit 12' to the sensor 11M'. The sensor 11M' reflects the settings based on the command at time 104, and in this case, starts performing imaging in Mode 2. Likewise, in a case where the side of the sensor 11S' is also instructed to switch from Mode 1 to Mode 2, a standby transition command is transmitted from the control unit 12' at time t102 (a point of time slightly later), and a streaming transition command is transmitted at time t104. In this manner, mode transition needs to be performed via SW Standby (software standby).

Therefore, in the slave-side sensor 11S', the mode change is reflected starting from time t106, and imaging in Mode 2 is started. On the side of the master-side sensor 11M', imaging in Mode 2 is started from time t104. On the side of the sensor 11S', on the other hand, imaging in Mode 2 is started from time t106, which is a point of time later than time t104. Control to prevent such a difference in the timing of mode change reflection is described below with reference to FIG. 13.

Figure 13:
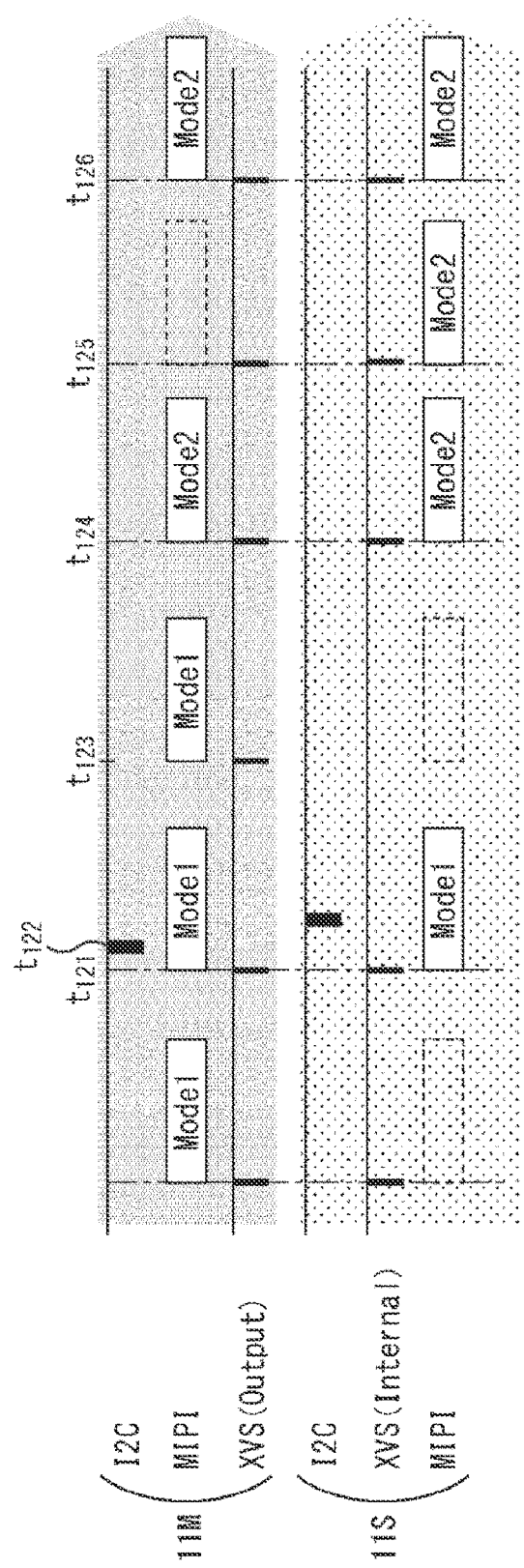
FIG. 13 is a diagram for explaining a process for aligning mode switching timings.

FIG. 13 is a diagram for explaining a process related to mode change to which the present technology is applied. At time t122, a command to switch the mode from Mode 1 to Mode 2 is issued from the control unit 12 to the sensor 11M and the sensor 11S.

The command issued to the sensor 11M includes an instruction to switch the mode from Mode 1 to Mode 2, and an instruction related to the reflection timing. In the example illustrated in FIG. 13, since the instruction to switch the mode starting from the second synchronization signal is issued, the sensor 11M generates the first synchronization signal at time t123, switches the mode from Mode 1 to Mode 2 at the time when the second synchronization signal is generated at time t124, and then perform imaging.

In the case of the conventional example illustrated in FIG. 12, as for the command received at time t102, the parameters are reflected at time t104 at which the next synchronization signal is generated. However, in the case of the example to which the present technology is applied as illustrated in FIG. 13, as for the command received at time t122, the parameters are reflected at time t124 at which the synchronization signal two frames later is generated.

The command issued to the master-side sensor 11M includes an instruction to delay the timing to reflect the parameters as appropriate. Although the delay amount is two frames herein, the delay amount is only required to be one or more frames.

The command issued to the slave-side sensor 11S is a control command for switching imaging modes during streaming. By providing such a control command in the example illustrated in FIG. 13, the parameters in the control command received at time t122 are reflected at time t124, and imaging in Mode 2 can be started.

As described above, the master-side sensor 11M has a function of delaying the timing of parameter reflection as appropriate, and the slave-side sensor 11S is provided with a control command for switching imaging modes during streaming, so that modes can be switched at any appropriate timing in the sensor 11M and the sensor 11S.

In the slave-side sensor 11S, there is no SW Standby, and modes can be changed. Thus, the time before the next frame is output, which is called a shutter lag, can be shortened.

Figure 14:
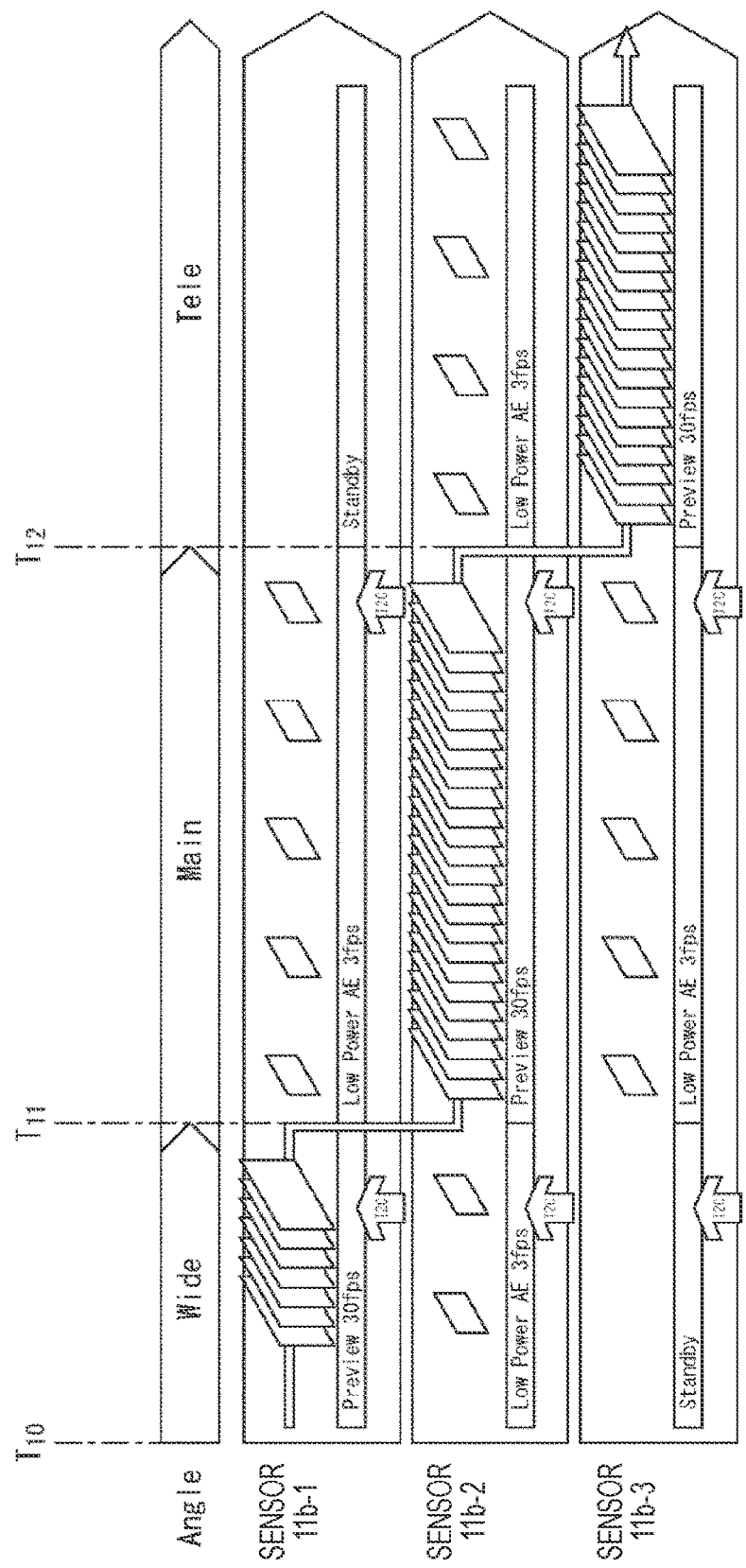
FIG. 14 is a diagram for explaining an operation to be performed when a zoom function is executed.

As modes can be switched at any timing while the sensor 11M and the sensor 11S are in synchronization with each other, a zooming operation to switch among the wide-angle-end sensor 11b-1, the main sensor 11b-2, and the telephoto-end sensor 11b-3 can be smoothly performed, for example, as illustrated in FIG. 14.

From time T10 to time T11, an image captured by the sensor 11b-1 on the wide-angle end side is output as a preview image, for example. In a case where the sensor 11b-1 is performing imaging in the normal mode, the sensor 11b-2 is performing imaging in the decimation mode, and the sensor 11b-3 is in a standby state. Performing imaging in the decimation mode, the sensor 11b-2 is in a power saving mode, and is being driven in a mode in which power consumption is lowered, as described above with reference to FIG. 10.

At time T11, the image to be output as a preview image is switched from an image captured by the sensor 11b-1 on the wide-angle end side to an image captured by the main sensor 11b-2. In this switching, the process at a time of mode switching described above with reference to FIG. 13 is adopted, and the mode switching can be performed at desired timing, which is time T11 in FIG. 14. This transition from the sensor 11b-1 to the sensor 11b-2 can be smoothly performed, and preview images can be provided to the user without interruption.

Switching of exposure conditions is also performed as described above with reference to FIG. 9, and the switching can be performed in a synchronized state among a plurality of sensors 11 at any timing, though the image to be output as a preview image is changed at that time.

From time T11 to time T12, an image captured by the main sensor 11b-2 is output as a preview image. From time T11 to time T12, both the sensor 11b-1 and the sensor 11b-3 are performing imaging in the decimation mode, and accordingly, are driven in a mode in which power consumption is lowered.

At time T12, the image to be output as a preview image is switched from an image captured by the main sensor 11b-2 to an image captured by the telephoto-end sensor 11b-3. In this switching, the process at a time of mode switching described above with reference to FIG. 13 is adopted, and thus, the mode switching can be smoothly performed at time T12. This transition from the sensor 11b-2 to the sensor 11b-3 can be smoothly performed, and preview images can be provided to the user without interruption.

After time T12, an image captured by the sensor 11b-3 on the telephoto end side is output as a preview image. In a case where the sensor 11b-3 is performing imaging in the normal mode, the sensor 11b-2 is performing imaging in the decimation mode, and the sensor 11b-1 is in a standby state. Performing imaging in the decimation mode, the sensor 11b-2 is in a power saving mode, and is being driven in a mode in which power consumption is lowered, as described above with reference to FIG. 10.

As described above, in a case where a zooming operation is performed so as to switch from the wide-angle-end sensor 11b-1 to the main sensor 11b-2, and from the main sensor 11b-2 to the telephoto-end sensor 11b-3, switching among the sensors 11b can be smoothly performed. Thus, images can be provided to the user without interruption, and the size of the captured image being provided can be smoothly changed.

<Operation of an Imaging Device>

Figure 15:
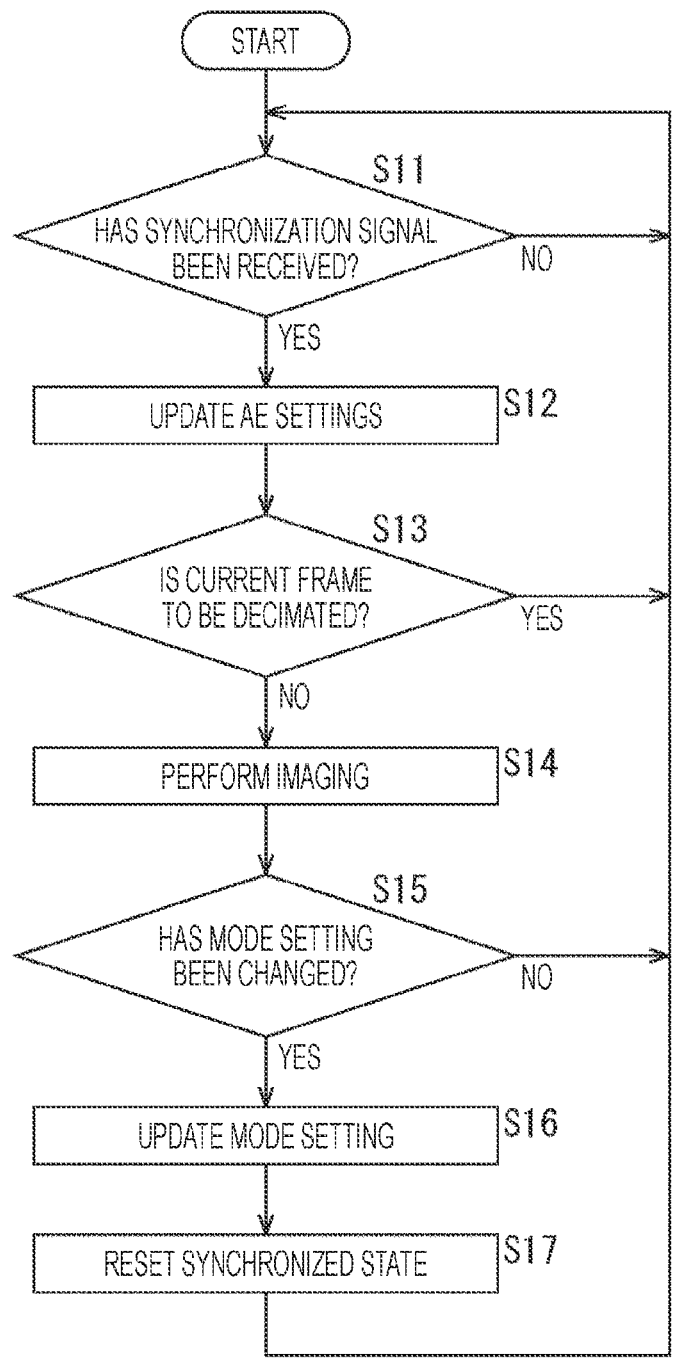
FIG. 15 is a chart for explaining an operation of an imaging device.

Referring now to a flowchart shown in FIG. 15, the operation of the imaging device 10 that performs the process described above is additionally described. Since the above-described process relates primarily to the slave-side sensor 11S, the operation of the sensor 11S is mainly described herein.

In step S11, the synchronization signal reception unit 73 of the sensor 11S determines whether or not a synchronization signal has been received. If it is determined in step S11 that any synchronization signal has not been received, the process returns to step S11, and the subsequent process is repeated.

If it is determined in step S11 that a synchronization signal has been received, on the other hand, the process moves on to step S12. In step S12, the AE settings are updated. In a case where a command has been received, a process of changing the AE settings, or changing the settings from AE1 to AE2, for example, is performed as described with reference to FIG. 9. In a case where any command has not been received, the AE settings are reset. The process in step S12 may be performed only in a case where a command has been received.

In step S13, a check is made to determine whether or not the frame is a frame to be decimated. The determination as to whether or not the frame is a decimation frame is performed as follows. First, in a case where "n-skip" is designated from the control unit 12, the sensor 11S outputs only one frame among n consecutive frames, and does not output the other frames, or sets the other frames as the frames to be decimated.

The control unit 12 can designate which frame among the n consecutive frames is to be output, and such designation is also included in a command and is supplied to the sensor 11S. The cycle of n consecutive frames is counted in such a manner that the frame in which streaming is started is the 0th frame, sequentially followed by the first frame, the second frame, . . . , for example. In a case where the number of frames to be decimated (skipped) is changed, or a mode transition is performed, the number n is initialized.

In step S13, the signal processing unit 72 determines whether or not the frame is a frame set to be decimated by the control unit 12. If the frame is determined to be a frame to be decimated, the process returns to step S11, and the subsequent process is repeated.

If the frame is determined not to be a frame to be decimated in step S13, or if the frame is determined to be a frame to be captured without decimation, on the other hand, the process moves on to step S14. In step S14, imaging (image capturing) is performed. In step S15, the signal processing unit 72 then determines whether or not the mode setting has been changed.

If it is determined in step S15 that the mode setting has not been changed, the process returns to step S11, and the subsequent process is repeated. If it is determined in step S15 that the mode setting has been changed, on the other hand, the process moves on to step S16.

In step S16, the signal processing unit 72 updates the mode setting. As for the process related to such updating of the mode setting, a control command for updating the mode setting is received from the control unit 12, and the mode setting is performed on the basis of the command, as described above with reference to FIG. 13.

In step S17, the synchronized state is reset. After the synchronized state is reset, the process returns to step S11, and the subsequent process is repeated.

As described above, the process is performed in the slave-side sensor 11S. Thus, as described above with reference to FIGS. 9 and 13, a change of the exposure condition and a change of the mode setting can be performed in synchronization with the master-side sensor 11M.

The process according to the flowchart shown in FIG. 15 can also be applied in a case where the master-side sensor 11M operates in the decimation mode.

<Transmission and Reception of a Command with a Large Data Amount>

As described above with reference to FIG. 13, according to the present technology, the sensor 11M and the sensor 11S can change modes in synchronization. The command transmitted from the control unit 12 and received by the sensor 11 for a mode change includes imaging mode parameters such as Still, Video, and Preview, for example, and the data amount thereof exceeds 100 bytes in some cases, for example.

In a case where a command having such a large data amount is transmitted and received, there is a possibility that synchronization of the mode change will be later than the desired timing due to the time required for transmission and reception of the command.

Figure 16:
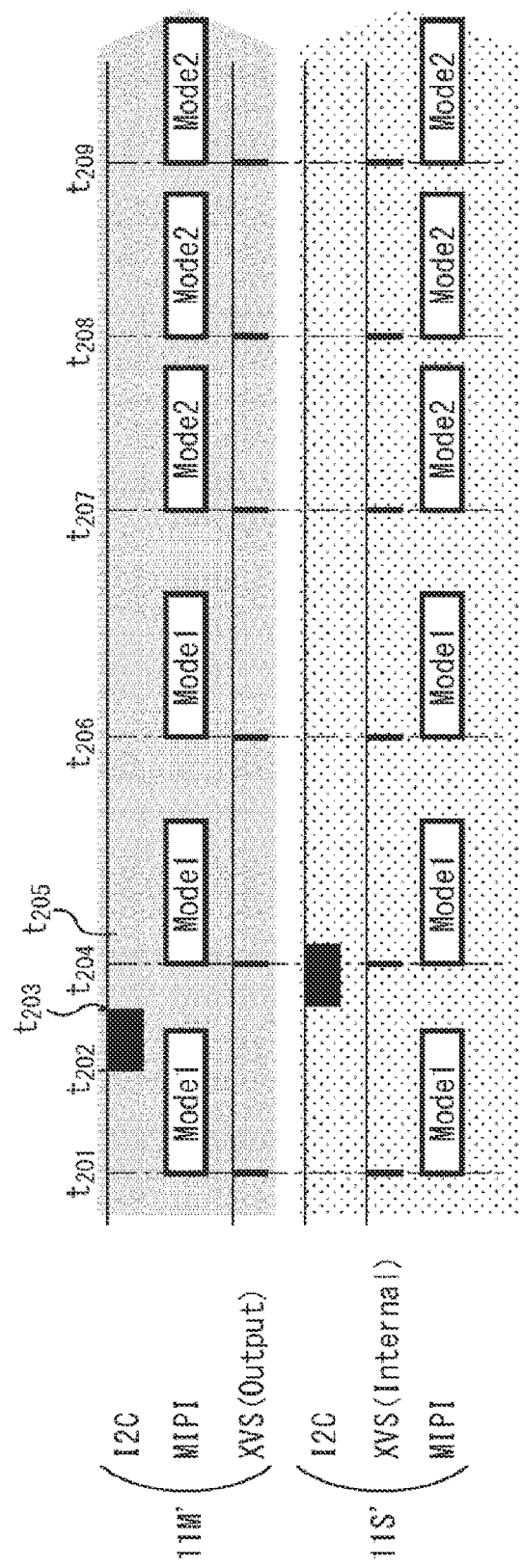
FIG. 16 is a diagram for explaining a process related to transmission and reception of a command with a large data amount.

This aspect is now described with reference to FIG. 16. FIG. 16 is a diagram for explaining conventional command transmission and reception. At time t201, the sensor 11M' and the sensor 11S' perform imaging in Mode 1, on the basis of a synchronization signal.

At time t202, the sensor 11M' receives a command from the control unit 12'.

The command is transmitted and received over the period from time t202 to time t203. Since it is necessary to transmit and receive mode parameters exceeding 100 bytes according to the specification of the sensor 11, for example, the time required for transmission and reception is also a duration corresponding to the data amount of the command.

The side of the sensor 11S receives a command from the control unit 12' over the period from time t203 to time t205. Like the command received by the sensor 11M', this command has a large data amount, and therefore, there is a possibility that the time required for transmission and reception will be long. For example, as illustrated in FIG. 16, there is a possibility that the command will be received over the synchronization signal generated at time t204.

For example, in a case where the settings in the command are reflected one frame later (the second synchronization signal), the mode setting is changed at time t206 on the side of the sensor 11M', and the mode setting is changed at time t207 on the side of the sensor 11S'. Here, in a case where the timings at which the mode setting is changed are aligned, the side of the sensor 11M' needs to perform a mode change at time t207, which is two frames later.

As described above, in a case where a command having a large data amount is transmitted and received, there is a possibility that transmission and reception cannot be performed in the targeted frame, and in such a case, there is a possibility that a difference appears in the mode transition timing. To counter this, the data amount of the command to be transmitted and received is reduced, and the time required for transmission and reception is shortened, so that such a difference in the mode transition timing can be prevented. This operation is now described with reference to FIG. 17.

Figure 17:
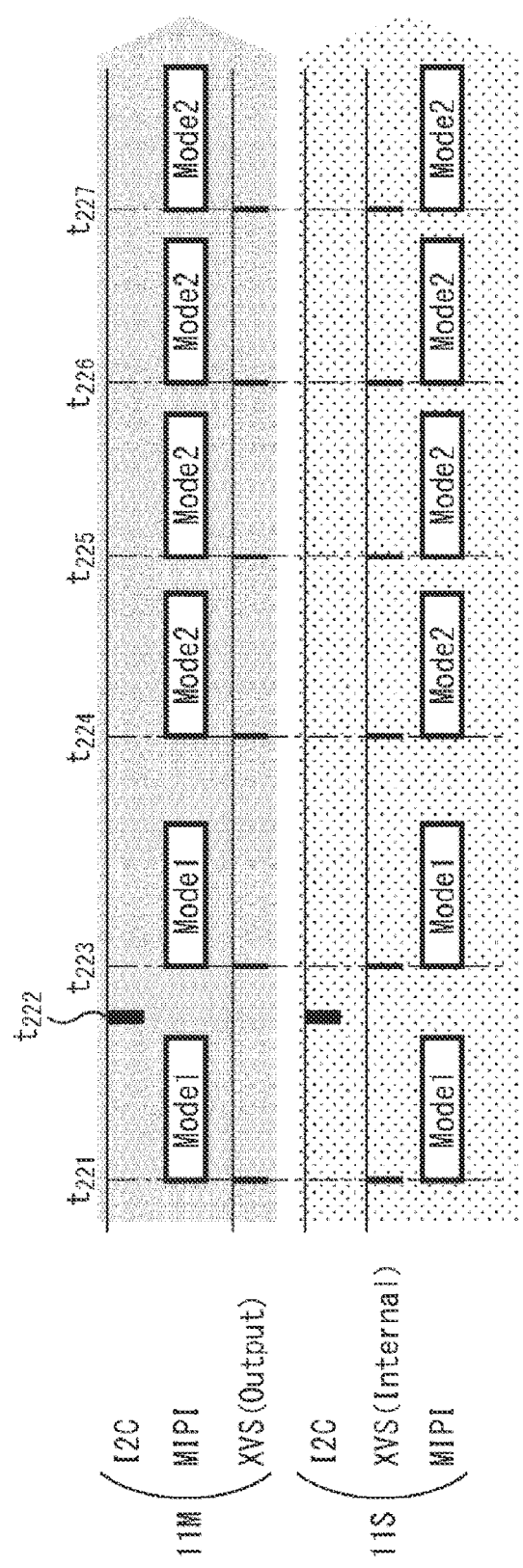
FIG. 17 is a diagram for explaining a process related to transmission and reception of a command with a small data amount.

At time t222, the sensor 11M receives, from the control unit 12, a command related to mode switching. As described above with reference to FIGS. 18 and 19, this command is a command having a small data amount (a code with a short data string). Since the command has a small data amount, the time required for transmission and reception is short. As illustrated in FIG. 17, at substantially the same time t222, the sensor 11S also receives a command related to mode switching, from the control unit 12.

As described above, the sensor 11M and the sensor 11S can receive a command having a small data amount at substantially the same time. Accordingly, in the sensor 11M and the sensor 11S, settings (parameters) based on a command can be reflected at a desired timing. For example, in the example illustrated in FIG. 17, at time t224 one frame later, the sensor 11M and the sensor 11S can perform imaging in Mode 2, which has been switched from Mode 1.

FIG. 18 is a table showing an example of commands that are transmitted from the control unit 12 and are held in the command holding unit 92 (FIG. 7). The command holding unit 92 of the control unit 12 holds a table in which modes (MC-Mode) are associated with commands (command), for example. An example case where, as illustrated in FIG. 2, for example, the three sensors 11b-1 to 11b-3 are provided in the imaging device 10 is described as an example herein.

A table 92 is now described with reference to FIG. 18. A mode "MC OFF" is a mode in which the three sensors 11b are in an off-state (the drive for imaging is stopped), and is associated with a command (000).

A mode "MC WIDE" is a mode in which the sensor 11b-1 that performs imaging on the wide-angle end side is driven in the normal mode, and the other sensors 11b-2 and 11b-3 stop the drive for imaging, and is associated with a command (001).

A mode "MC WIDE MAIN" is a mode in which the sensor 11b-1 on the wide-angle end side is driven in the normal mode, and the main sensor 11b-2 is driven in the decimation mode, and is associated with a command (010).

A mode "MC MAIN WIDE" is a mode in which the main sensor 11b-2 is driven in the normal mode, and the sensor 11b-1 on the wide-angle end side is driven in the decimation mode, and is associated with a command (011).

A mode "MC MAIN" is a mode in which the main sensor 11b-2 is driven in the normal mode, and the other sensors 11b-1 and 11b-3 stop the drive for imaging, and is associated with a command (100).

A mode "MC MAIN TELE" is a mode in which the main sensor 11b-2 is driven in the normal mode, and the sensor 11b-3 on the telephoto end side is driven in the decimation mode, and is associated with a command (101).

A mode "MC TELE MAIN" is a mode in which the main sensor 11b-3 on the telephoto end side is driven in the normal mode, and the main sensor 11b-2 is driven in the decimation mode, and is associated with a command (110).

A mode "MC TELE" is a mode in which the sensor 11b-3 on the telephoto end side is driven in the normal mode, and the other sensors 11b-1 and 11b-2 stop the drive for imaging, and is associated with a command (111).

In a case where the control unit 12 instructs the sensors 11b to enter a predetermined mode, the control unit 12 transmits the command associated with the predetermined mode. For example, in a case where the mode "MC WIDE MAIN" is to be set, (010) is transmitted as the command to the sensors 11b-1 to 11b-3.

The side of the sensors 11 holds tables as illustrated in FIG. 19, and is designed to read and perform processes corresponding to received commands.

Tables 56-1 to 56-3 illustrated in FIG. 19 are held on the side of the control unit 12, and in a case where the power supply to the imaging device 10b is turned on, the tables 56 corresponding to the respective sensors 11b are transferred, and are held in the table holding units 56 of the sensors 11b. Alternatively, the respective sensors 11b may be designed to hold the tables beforehand.

The sensor 11b-1 that performs imaging on the wide-angle end side holds the table 56-1, the sensor 11b-2 that is the main sensor holds the table 56-2, and the sensor 11b-3 that performs imaging on the telephoto end side holds the table 56-3. The respective tables 56 are held in the table holding units 56 of the respective sensors 11b.

Each table 56 is a table in which mode registers (Mc Mode Register), LUT Start for identifying the start position of a LUT, and LUT ctrl for specifying the number of times looping is allowed in the LUT are associated with one another.

LUT Start defines which lookup table to start from, and LUT ctrl defines how many times the parameters are to be looped as defined in the lookup table from which it starts. For example, in a case where LUT Start is "LUT A", and LUT ctrl is "1 loop", it means to start from a table LUT A and make a loop once.

The table shown in the column of LUT Start is prepared separately (not shown). For example, in a case where "LUT A" is shown in LUT Start, the portion corresponding to "LUT A" in the table prepared separately is referred to. A table to be referred to by the table prepared separately may be further prepared. The table to be referred to by LUT Start may be an auto exposure bracketing table (AEB Table), for example.

In Mc Mode Register in each table 56, items such as "MC OFF", "MC WIDE", "MC WIDE MAIN", "MC MAIN WIDE", "MC MAIN", "MC MAIN TELE", "MC TELE MAIN", and "MC TELE", which are shown in the column of Mc-Mode in the table 92 (FIG. 18) held on the side of the control unit 12, are provided.

The table 56-1 is now described. In "MC OFF" in the table 56-1, "LUT Start" is associated with "OFF", and "LUT ctrl" is left blank. In a case where the command from the control unit 12 is (000), the sensor 11b-1 is put into an off-state (the low power consumption mode).

In "MC WIDE" in the table 56-1, "LUT Start" is associated with "LUT A", and "LUT ctrl" is associated with "1 loop". In "MC WIDE MAIN" in the table 56-1, "LUT Start" is associated with "LUT A", and "LUT ctrl" is associated with "1 loop". In a case where the command from the control unit 12 is (001) or (010), the sensor 11b-1 is set to perform processing with the value defined by LUT A in one loop, by referring to the table LUT A.

In "MC MAIN WIDE" in the table 56-1, "LUT Start" is associated with "LUT B", and "LUT ctrl" is associated with "1 loop". In a case where the command from the control unit 12 is (011), the sensor 11b-1 is set to perform processing with the value defined by LUT B in one loop, by referring to the table LUT B.

In "MC MAIN" in the table 56-1, "LUT Start" is associated with "OFF", and "LUT ctrl" is left blank. In "MC MAIN TELE" in the table 56-1, "LUT Start" is associated with "OFF", and "LUT ctrl" is left blank. In "MC TELE MAIN" in the table 56-1, "LUT Start" is associated with "OFF", and "LUT ctrl" is left blank. In "MC TELE" in the table 56-1, "LUT Start" is associated with "OFF", and "LUT ctrl" is left blank. In a case where the command from the control unit 12 is (100), (101), (110), or (111), the sensor is set in an off-state.

Since the sensor 11b-1 is a camera that performs imaging on the wide-angle end side, the sensor 11b-1 holds the table 56-1, according to which the sensor 11b-1 is driven when performing imaging on the wide-angle end side.

The table 56-2 is now described. In "MC OFF" in the table 56-2, "LUT Start" is associated with "OFF", and "LUT ctrl" is left blank. In "MC WIDE" in the table 56-2, "LUT Start" is associated with "OFF", and "LUT ctrl" is left blank.

In a case where the command from the control unit 12 is (000) or (001), the sensor 11b-2 is set in an off-state.

In "MC WIDE MAIN" in the table 56-2, "LUT Start" is associated with "LUT B", and "LUT ctrl" is associated with "1 loop". In a case where the command from the control unit 12 is (010), the sensor 11b-2 is set to perform processing with the value defined by LUT B in one loop, by referring to the table LUT B.

In "MC MAIN WIDE" in the table 56-2, "LUT Start" is associated with "LUT A", and "LUT ctrl" is associated with "1 loop". In "MC MAIN" in the table 56-2, "LUT Start" is associated with "LUT A", and "LUT ctrl" is associated with "1 loop". "MC MAIN TELE" in the table 56-2 is associated with "LUT A", and "LUT ctrl" is associated with "1 loop". In a case where the command from the control unit 12 is (011), (100), or (101), the sensor 11b-2 is set to perform processing with the value defined by LUT A in one loop, by referring to the table LUT A.

In "MC TELE MAIN" in the table 56-2, "LUT Start" is associated with "LUT B", and "LUT ctrl" is associated with "1 loop". In a case where the command from the control unit 12 is (110), the sensor 11b-2 is set to perform processing with the value defined by LUT B in one loop, by referring to the table LUT B.

In "MC TELE" in the table 56-2, "LUT Start" is associated with "OFF", and "LUT ctrl" is left blank. In a case where the command from the control unit 12 is (111), the sensor is set in an off-state.

Since the sensor 11b-2 is the main camera, the sensor 11b-2 holds the table 56-2, according to which the sensor 11b-2 is in a driving mode more often than the other sensors 11b, and is often in a mode in which the sensor 11b-2 is driven together with the sensor 11b-1 on the wide-angle end side, or is driven together with the sensor 11b-3 on the telephoto end side.

The table 56-3 is now described. In "MC OFF" in the table 56-3, "LUT Start" is associated with "OFF", and "LUT ctrl" is left blank.

In "MC WIDE" in the table 56-3, "LUT Start" is associated with "OFF", and "LUT ctrl" is left blank. In "MC WIDE MAIN" in the table 56-3, "LUT Start" is associated with "OFF", and "LUT ctrl" is left blank. In "MC MAIN WIDE" in the table 56-3, "LUT Start" is associated with "OFF", and "LUT ctrl" is left blank. In "MC MAIN" in the table 56-3, "LUT Start" is associated with "OFF", and "LUT ctrl" is left blank. In a case where the command from the control unit 12 is (000), (001), (010), (011), or (100), the sensor 11b-3 is set in an off-state.

In "MC MAIN TELE" in the table 56-3, "LUT Start" is associated with "LUT B", and "LUT ctrl" is associated with "1 loop". In a case where the command from the control unit 12 is (101), the sensor 11b-3 is set to perform processing with the value defined by LUT B in one loop, by referring to the table LUT B.

In "MC TELE MAIN" in the table 56-3, "LUT Start" is associated with "LUT A", and "LUT ctrl" is associated with "1 loop". In "MC TELE" in the table 56-3, "LUT Start" is associated with "LUT A", and "LUT ctrl" is associated with "1 loop". In a case where the command from the control unit 12 is (110) or (111), the sensor 11b-3 is set to perform processing with the value defined by LUT A in one loop, by referring to the table LUT A.

Since the sensor 11b-3 is a camera that performs imaging on the telephoto side, the sensor 11b-3 holds the table 56-3, according to which the sensor 11b-3 is driven when performing imaging on the telephoto side.

In this manner, a different table is held in each sensor 11. The control unit 12 sends the same command to a plurality of sensors 11, and the side of each sensor 11 performs its own setting by referring to the table 56 held therein. The data amount of a command to be transmitted and received can be reduced, and the control unit 12 can perform a process of switching modes at desired timing without causing a frame shift, and the like.

By reducing the data amount of the command to be exchanged between a sensor 11 and the control unit 12, the time required for communication between the sensor 11 and the control unit 12 can be shortened, and a power consumption lowering effect is also achieved.

Although a case where the control unit 12 controls three sensors 11 has been described herein as an example, the number of sensors 11 that are controlled by the control unit 12 is not necessarily three, and the control unit 12 can be designed to control a larger number of sensors 11. Even in a case where the number of sensors 11 that are controlled by the control unit 12 is larger, a command with a small data amount is transmitted to a plurality of sensors 11 as described above, so that each sensor 11 can be made to perform processing (setting).

Accordingly, it is possible to control the plurality of sensors 11 without increasing the processing in the control unit 12. Also, it is possible to reduce the processing in the control unit 12, and secure more time for the control unit 12 to perform other processing.

As for LUT A and LUT B shown in the table 56 in FIG. 19, for example, parameters and the like are written in a table separate from the table 56. However, the parameters may be parameters written according to the specification of the imaging device 10. Furthermore, in that configuration, a plurality of tables other than the table 56 may be prepared and be sequentially referred to.

<Example Applications to Electronic Devices>

The present technology can be applied to all electronic devices using an imaging element in an image capturing unit (photoelectric conversion unit), such as an imaging device like a digital still camera or a video camera, a mobile terminal device having an imaging function, and a copying machine using an imaging element in an image reading unit. An imaging element may be formed as one chip, or may be in a modular form having an imaging function in which an imaging unit and a signal processing unit or an optical system are packaged together.

Figure 20:
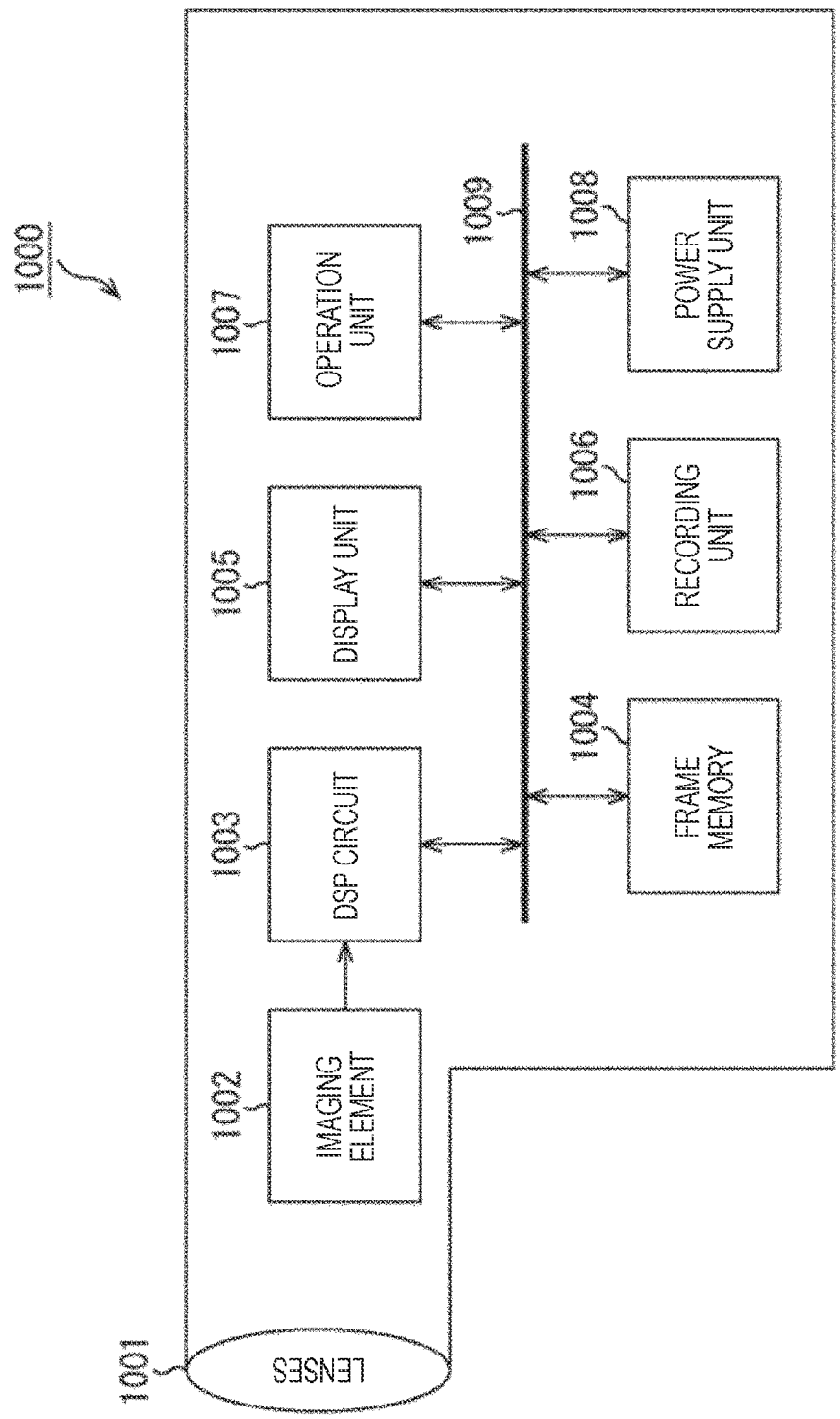
FIG. 20 is a diagram illustrating an example configuration of an electronic device.

FIG. 20 is a block diagram illustrating an example configuration of an imaging device as an electronic device to which the present technology is applied.

An imaging element 1000 in FIG. 20 includes an optical unit 1001 formed with lenses and the like, an imaging element (imaging device) 1002, and a digital signal processor (DSP) circuit 1003 that is a camera signal processing circuit. The imaging element 1000 also includes a frame memory 1004, a display unit 1005, a recording unit 1006, an operation unit 1007, and a power supply unit 1008. The DSP circuit 1003, the frame memory 1004, the display unit 1005, the recording unit 1006, the operation unit 1007, and the power supply unit 1008 are connected to one another via a bus line 1009.

The optical unit 1001 captures incident light (image light) from an object, and forms an image on the imaging surface of the imaging element 1002. The imaging element 1002 converts the amount of the incident light the image of which is formed on the imaging surface by the optical unit 1001, into an electric signal on a pixel basis, and outputs the electric signal as a pixel signal.

The display unit 1005 is formed with a flat-panel display such as a liquid crystal display (LCD) or an organic electroluminescence (EL) display, for example, and displays a video image or a still image formed by the imaging element 1002. The recording unit 1006 records the video image or the still image captured by the imaging element 1002 in a recording medium such as a hard disk or a semiconductor memory.

The operation unit 1007 issues operation commands for various functions of the imaging element 1000, being operated by the user. The power supply unit 1008 appropriately supplies various kinds of power that is the operating power supply for the DSP circuit 1003, the frame memory 1004, the display unit 1005, the recording unit 1006, and the operation unit 1007, to these supply targets.

The imaging devices 10a to 10d illustrated in FIGS. 1 to 4 can be applied to part of the imaging device illustrated in FIG. 20.

<Recording Medium>

The above-described series of processes can be performed by hardware or software. In a case where the series of processes is performed by software, a program forming the software is installed into a computer. Here, examples of the computer include a computer incorporated in dedicated hardware, and a general-purpose personal computer capable of executing various functions by installing various programs, for example.

Figure 21:
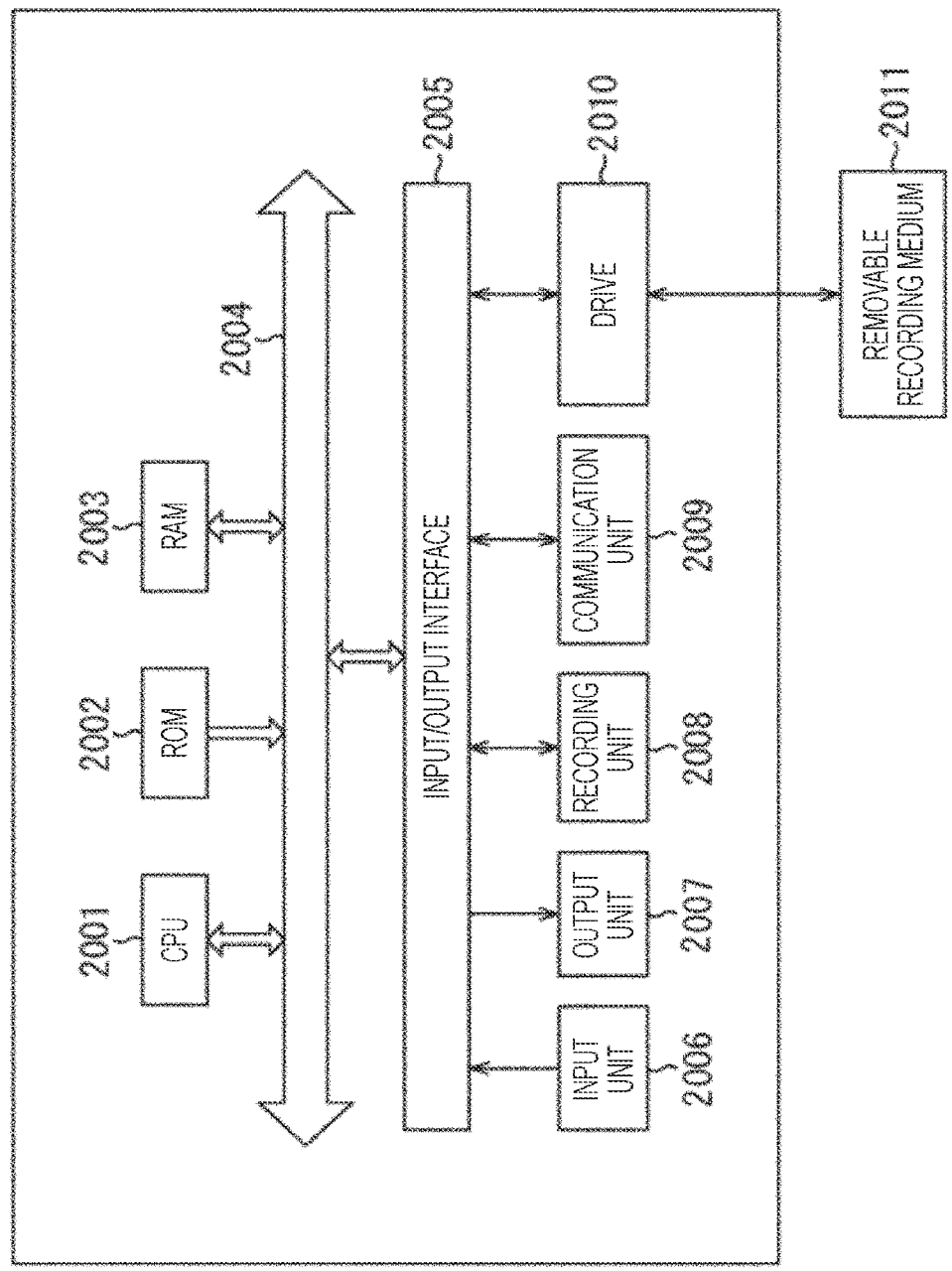
FIG. 21 is a diagram illustrating an example configuration of a personal computer.

FIG. 21 is a block diagram illustrating an example configuration of the hardware of a computer that performs the above-described series of processes according to a program. In the computer, a central processing unit (CPU) 2001, a read only memory (ROM) 2002, and a random access memory (RAM) 2003 are connected to one another by a bus 2004. An input/output interface 2005 is further connected to the bus 2004. An input unit 2006, an output unit 2007, a storage unit 2008, a communication unit 2009, and a drive 2010 are connected to the input/output interface 2005.

The input unit 2006 includes a keyboard, a mouse, a microphone, and the like. The output unit 2007 includes a display, a speaker, and the like. The storage unit 2008 includes a hard disk, a nonvolatile memory, and the like. The communication unit 2009 includes a network interface and the like. The drive 2010 drives a removable recording medium 2011 such as a magnetic disk, an optical disk, a magneto-optical disk, or a semiconductor memory.

In the computer designed as described above, the CPU 2001 loads, for example, a program stored in the storage unit 2008 into the RAM 2003 via the input/output interface 2005 and the bus 2004, and executes the program, so that the series of processes described above is performed.

The program to be executed by the computer (the CPU 2001) may be recorded on the removable recording medium 2011 as a packaged medium or the like, for example, and be then provided. Also, the program can be provided via a wired or wireless transmission medium such as a local area network, the Internet, or digital satellite broadcasting.

In the computer, the removable recording medium 2011 is set in the drive 2010, so that the program can be installed into the storage unit 2008 via the input/output interface 2005. Also, the program can be received by the communication unit 2009 via a wired or wireless transmission medium, and be installed into the storage unit 2008. Other than the above, the program can be installed beforehand into the ROM 2002 or the storage unit 2008.

Note that the program to be executed by the computer may be a program that is processed in time series in the sequence described in the present specification, or may be a program that is processed in parallel or at necessary timings such as when a call is made.

<Example Application to an Endoscopic Surgery System>

The technology according to the present disclosure (the present technology) can be applied to various products. For example, the technology according to the present disclosure may be applied to an endoscopic surgery system.

Figure 22:
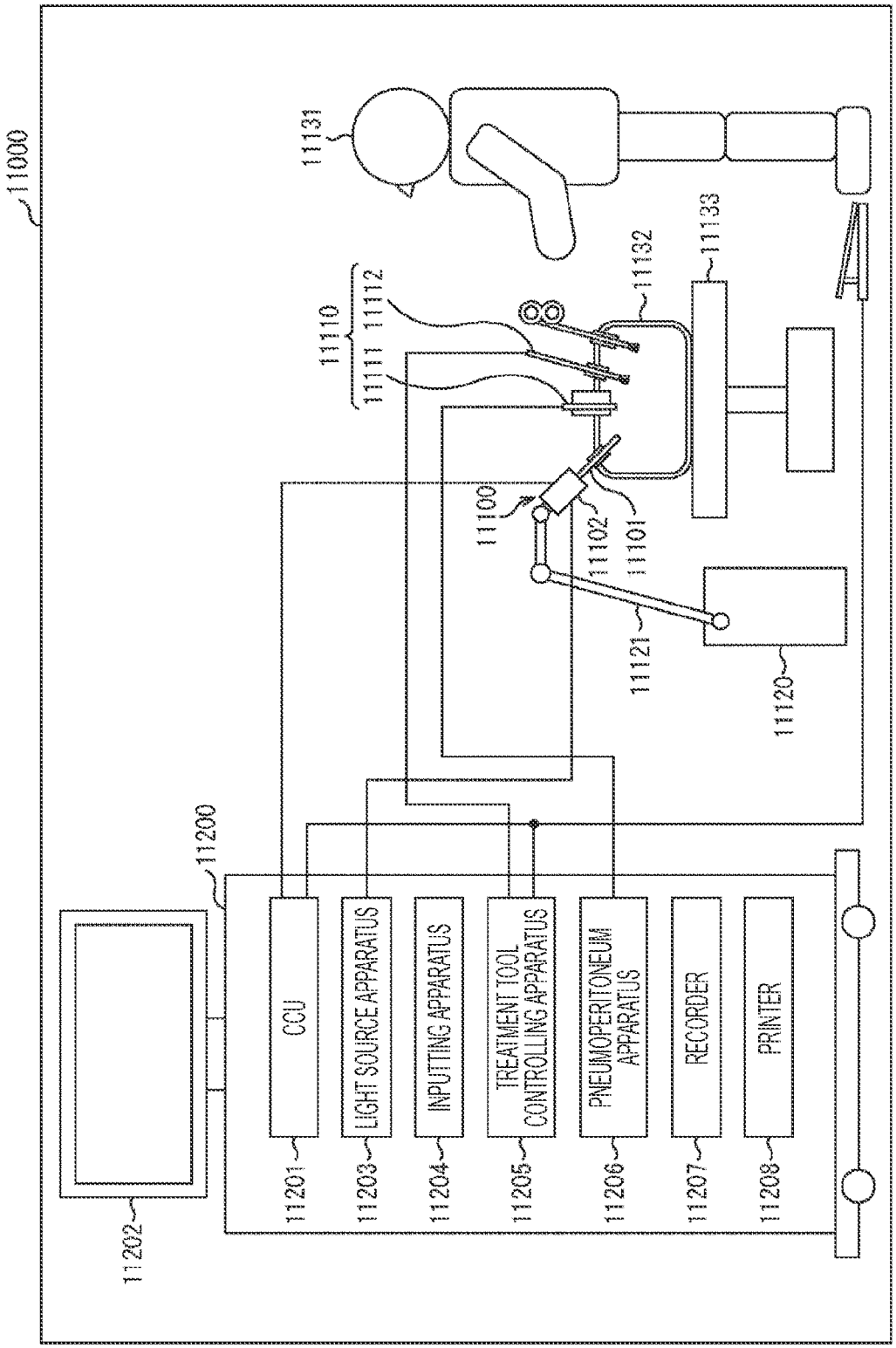
FIG. 22 is a diagram illustrating an example of a schematic configuration of an endoscopic surgery system.

FIG. 22 is a diagram illustrating an example of a schematic configuration of an endoscopic surgery system to which the technology according to an embodiment of the present disclosure (the present technology) can be applied.

FIG. 22 illustrates a state in which a surgeon (a medical doctor) 11131 is using an endoscopic surgery system 11000 to perform surgery for a patient 11132 on a patient bed 11133. As depicted, the endoscopic surgery system 11000 includes an endoscope 11100, other surgical tools 11110 such as a pneumoperitoneum tube 11111 and an energy device 11112, a supporting arm apparatus 11120 which supports the endoscope 11100 thereon, and a cart 11200 on which various apparatus for endoscopic surgery are mounted.

The endoscope 11100 includes a lens barrel 11101 having a region of a predetermined length from a distal end thereof to be inserted into a body cavity of the patient 11132, and a camera head 11102 connected to a proximal end of the lens barrel 11101. In the example depicted, the endoscope 11100 is depicted which includes as a rigid endoscope having the lens barrel 11101 of the hard type. However, the endoscope 11100 may otherwise be included as a flexible endoscope having the lens barrel 11101 of the flexible type.

The lens barrel 11101 has, at a distal end thereof, an opening in which an objective lens is fitted. A light source apparatus 11203 is connected to the endoscope 11100 such that light generated by the light source apparatus 11203 is introduced to a distal end of the lens barrel 11101 by a light guide extending in the inside of the lens barrel 11101 and is irradiated toward an observation target in a body cavity of the patient 11132 through the objective lens. It is to be noted that the endoscope 11100 may be a forward-viewing endoscope or may be an oblique-viewing endoscope or a side-viewing endoscope.

An optical system and an image pickup element are provided in the inside of the camera head 11102 such that reflected light (observation light) from the observation target is condensed on the image pickup element by the optical system. The observation light is photo-electrically converted by the image pickup element to generate an electric signal corresponding to the observation light, namely, an image signal corresponding to an observation image. The image signal is transmitted as RAW data to a CCU 11201.

The CCU 11201 includes a central processing unit (CPU), a graphics processing unit (GPU) or the like and integrally controls operation of the endoscope 11100 and a display apparatus 11202. Further, the CCU 11201 receives an image signal from the camera head 11102 and performs, for the image signal, various image processes for displaying an image based on the image signal such as, for example, a development process (demosaic process).

The display apparatus 11202 displays thereon an image based on an image signal, for which the image processes have been performed by the CCU 11201, under the control of the CCU 11201.

The light source apparatus 11203 includes a light source such as, for example, a light emitting diode (LED) and supplies irradiation light upon imaging of a surgical region to the endoscope 11100.

An inputting apparatus 11204 is an input interface for the endoscopic surgery system 11000. A user can perform inputting of various kinds of information or instruction inputting to the endoscopic surgery system 11000 through the inputting apparatus 11204. For example, the user would input an instruction or a like to change an image pickup condition (type of irradiation light, magnification, focal distance or the like) by the endoscope 11100.

A treatment tool controlling apparatus 11205 controls driving of the energy device 11112 for cautery or incision of a tissue, sealing of a blood vessel or the like. A pneumoperitoneum apparatus 11206 feeds gas into a body cavity of the patient 11132 through the pneumoperitoneum tube 11111 to inflate the body cavity in order to secure the field of view of the endoscope 11100 and secure the working space for the surgeon. A recorder 11207 is an apparatus capable of recording various kinds of information relating to surgery. A printer 11208 is an apparatus capable of printing various kinds of information relating to surgery in various forms such as a text, an image or a graph.

It is to be noted that the light source apparatus 11203 which supplies irradiation light when a surgical region is to be imaged to the endoscope 11100 may include a white light source which includes, for example, an LED, a laser light source or a combination of them. Where a white light source includes a combination of red, green, and blue (RGB) laser light sources, since the output intensity and the output timing can be controlled with a high degree of accuracy for each color (each wavelength), adjustment of the white balance of a picked up image can be performed by the light source apparatus 11203.

Further, in this case, if laser beams from the respective RGB laser light sources are irradiated time-divisionally on an observation target and driving of the image pickup elements of the camera head 11102 are controlled in synchronism with the irradiation timings. Then images individually corresponding to the R, G and B colors can be also picked up time-divisionally. According to this method, a color image can be obtained even if color filters are not provided for the image pickup element.

Further, the light source apparatus 11203 may be controlled such that the intensity of light to be outputted is changed for each predetermined time. By controlling driving of the image pickup element of the camera head 11102 in synchronism with the timing of the change of the intensity of light to acquire images time-divisionally and synthesizing the images, an image of a high dynamic range free from underexposed blocked up shadows and overexposed highlights can be created.

Further, the light source apparatus 11203 may be configured to supply light of a predetermined wavelength band ready for special light observation. In special light observation, for example, by utilizing the wavelength dependency of absorption of light in a body tissue to irradiate light of a narrow band in comparison with irradiation light upon ordinary observation (namely, white light), narrow band observation (narrow band imaging) of imaging a predetermined tissue such as a blood vessel of a superficial portion of the mucous membrane or the like in a high contrast is performed. Alternatively, in special light observation, fluorescent observation for obtaining an image from fluorescent light generated by irradiation of excitation light may be performed. In fluorescent observation, it is possible to perform observation of fluorescent light from a body tissue by irradiating excitation light on the body tissue (autofluorescence observation) or to obtain a fluorescent light image by locally injecting a reagent such as indocyanine green (ICG) into a body tissue and irradiating excitation light corresponding to a fluorescent light wavelength of the reagent upon the body tissue.

The light source apparatus 11203 can be configured to supply such narrow-band light and/or excitation light suitable for special light observation as described above.

Figure 23:
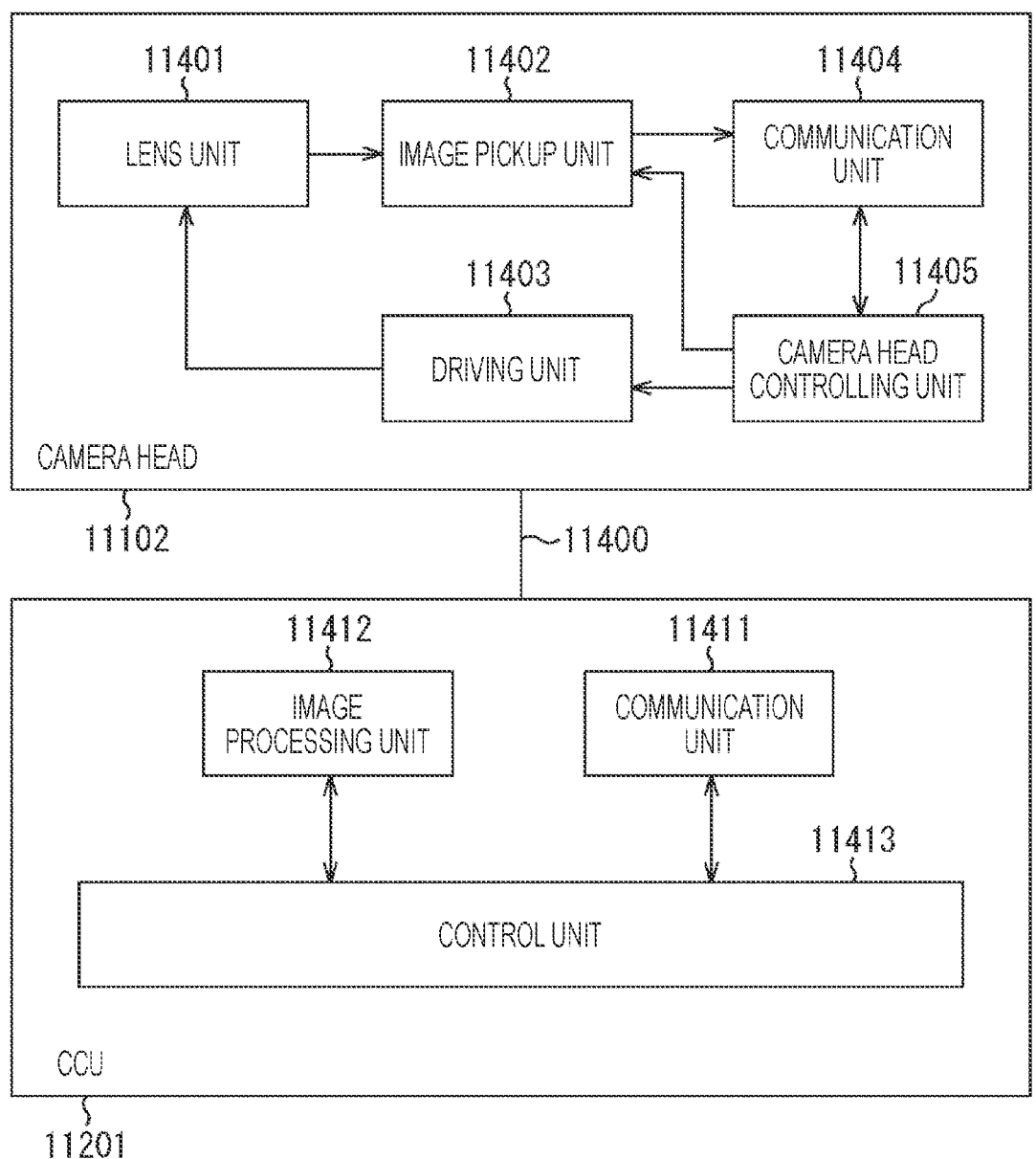
FIG. 23 is a block diagram illustrating an example of the functional configurations of a camera head and a camera control unit (CCU).

FIG. 23 is a block diagram showing an example of the functional configurations of the camera head 11102 and the CCU 11201 shown in FIG. 22.

The camera head 11102 includes a lens unit 11401, an image pickup unit 11402, a driving unit 11403, a communication unit 11404 and a camera head controlling unit 11405. The CCU 11201 includes a communication unit 11411, an image processing unit 11412 and a control unit 11413. The camera head 11102 and the CCU 11201 are connected for communication to each other by a transmission cable 11400.

The lens unit 11401 is an optical system, provided at a connecting location to the lens barrel 11101.

Observation light taken in from a distal end of the lens barrel 11101 is guided to the camera head 11102 and introduced into the lens unit 11401. The lens unit 11401 includes a combination of a plurality of lenses including a zoom lens and a focusing lens.

The number of image pickup elements which is included by the image pickup unit 11402 may be one (single-plate type) or a plural number (multi-plate type). Where the image pickup unit 11402 is configured as that of the multi-plate type, for example, image signals corresponding to respective R, G and B are generated by the image pickup elements, and the image signals may be synthesized to obtain a color image. The image pickup unit 11402 may also be configured so as to have a pair of image pickup elements for acquiring respective image signals for the right eye and the left eye ready for three dimensional (3D) display. If 3D display is performed, then the depth of a living body tissue in a surgical region can be comprehended more accurately by the surgeon 11131.

It is to be noted that, where the image pickup unit 11402 is configured as that of stereoscopic type, a plurality of systems of lens units 11401 are provided corresponding to the individual image pickup elements.

Further, the image pickup unit 11402 may not necessarily be provided on the camera head 11102. For example, the image pickup unit 11402 may be provided immediately behind the objective lens in the inside of the lens barrel 11101.

The driving unit 11403 includes an actuator and moves the zoom lens and the focusing lens of the lens unit 11401 by a predetermined distance along an optical axis under the control of the camera head controlling unit 11405. Consequently, the magnification and the focal point of a picked up image by the image pickup unit 11402 can be adjusted suitably.

The communication unit 11404 includes a communication apparatus for transmitting and receiving various kinds of information to and from the CCU 11201. The communication unit 11404 transmits an image signal acquired from the image pickup unit 11402 as RAW data to the CCU 11201 through the transmission cable 11400.

In addition, the communication unit 11404 receives a control signal for controlling driving of the camera head 11102 from the CCU 11201 and supplies the control signal to the camera head controlling unit 11405. The control signal includes information relating to image pickup conditions such as, for example, information that a frame rate of a picked up image is designated, information that an exposure value upon image picking up is designated and/or information that a magnification and a focal point of a picked up image are designated.

It is to be noted that the image pickup conditions such as the frame rate, exposure value, magnification or focal point may be designated by the user or may be set automatically by the control unit 11413 of the CCU 11201 on the basis of an acquired image signal. In the latter case, an auto exposure (AE) function, an auto focus (AF) function and an auto white balance (AWB) function are incorporated in the endoscope 11100.

The camera head controlling unit 11405 controls driving of the camera head 11102 on the basis of a control signal from the CCU 11201 received through the communication unit 11404.

The communication unit 11411 includes a communication apparatus for transmitting and receiving various kinds of information to and from the camera head 11102. The communication unit 11411 receives an image signal transmitted thereto from the camera head 11102 through the transmission cable 11400.

Further, the communication unit 11411 transmits a control signal for controlling driving of the camera head 11102 to the camera head 11102. The image signal and the control signal can be transmitted by electrical communication, optical communication or the like.

The image processing unit 11412 performs various image processes for an image signal in the form of RAW data transmitted thereto from the camera head 11102.

The control unit 11413 performs various kinds of control relating to image picking up of a surgical region or the like by the endoscope 11100 and display of a picked up image obtained by image picking up of the surgical region or the like. For example, the control unit 11413 creates a control signal for controlling driving of the camera head 11102.

Further, the control unit 11413 controls, on the basis of an image signal for which image processes have been performed by the image processing unit 11412, the display apparatus 11202 to display a picked up image in which the surgical region or the like is imaged. Thereupon, the control unit 11413 may recognize various objects in the picked up image using various image recognition technologies. For example, the control unit 11413 can recognize a surgical tool such as forceps, a particular living body region, bleeding, mist when the energy device 11112 is used and so forth by detecting the shape, color and so forth of edges of objects included in a picked up image. The control unit 11413 may cause, when it controls the display apparatus 11202 to display a picked up image, various kinds of surgery supporting information to be displayed in an overlapping manner with an image of the surgical region using a result of the recognition. Where surgery supporting information is displayed in an overlapping manner and presented to the surgeon 11131, the burden on the surgeon 11131 can be reduced and the surgeon 11131 can proceed with the surgery with certainty.

The transmission cable 11400 which connects the camera head 11102 and the CCU 11201 to each other is an electric signal cable ready for communication of an electric signal, an optical fiber ready for optical communication or a composite cable ready for both of electrical and optical communications.

Here, while, in the example depicted, communication is performed by wired communication using the transmission cable 11400, the communication between the camera head 11102 and the CCU 11201 may be performed by wireless communication.

<Example Applications to Mobile Structures>

The technology according to the present disclosure (the present technology) can be applied to various products. For example, the technology according to the present disclosure may be embodied as a device mounted on any type of mobile structure such as an automobile, an electric vehicle, a hybrid electric vehicle, a motorcycle, a bicycle, a personal mobility, an airplane, a drone, a ship, a robot, and the like.

Figure 24:
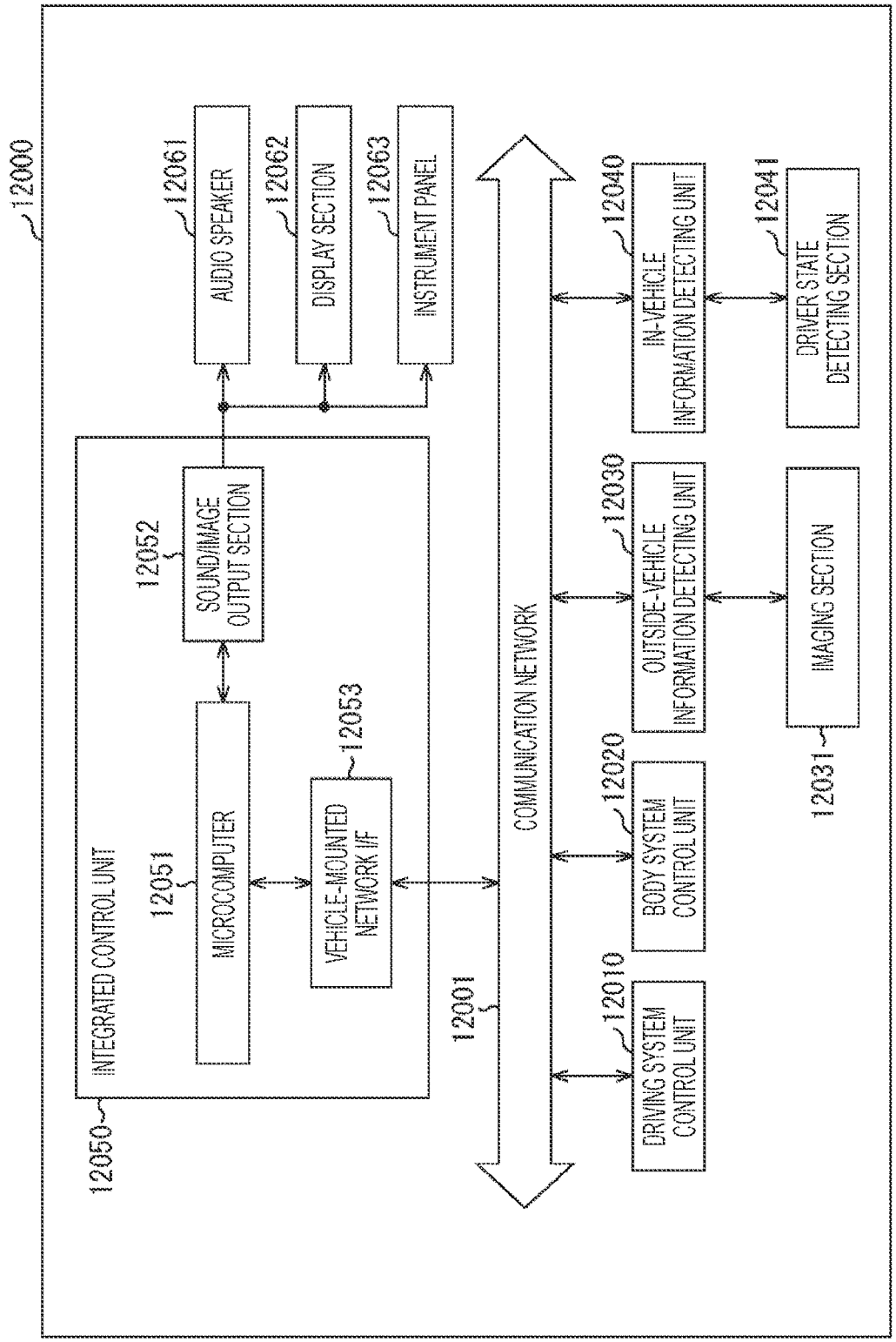
FIG. 24 is a block diagram illustrating an example of a schematic configuration of a vehicle control system.

FIG. 24 is a block diagram illustrating a schematic example configuration of a vehicle control system that is an example of a mobile structure control system to which the technology according to the present disclosure can be applied.

The vehicle control system 12000 includes a plurality of electronic control units connected to each other via a communication network 12001. In the example illustrated in FIG. 24, the vehicle control system 12000 is provided with a driving system control unit 12010, a body system control unit 12020, an outside-vehicle information detecting unit 12030, an in-vehicle information detecting unit 12040, and an integrated control unit 12050. In addition, a microcomputer 12051, a sound/image output section 12052, and a vehicle-mounted network interface (I/F) 12053 are illustrated as a functional configuration of the integrated control unit 12050.

The driving system control unit 12010 controls the operation of devices related to the driving system of the vehicle in accordance with various kinds of programs. For example, the driving system control unit 12010 functions as a control device for a driving force generating device for generating the driving force of the vehicle, such as an internal combustion engine, a driving motor, or the like, a driving force transmitting mechanism for transmitting the driving force to wheels, a steering mechanism for adjusting the steering angle of the vehicle, a braking device for generating the braking force of the vehicle, and the like.

The body system control unit 12020 controls the operation of various kinds of devices provided to a vehicle body in accordance with various kinds of programs. For example, the body system control unit 12020 functions as a control device for a keyless entry system, a smart key system, a power window device, or various kinds of lamps such as a headlamp, a backup lamp, a brake lamp, a turn signal, a fog lamp, or the like. In this case, radio waves transmitted from a mobile device as an alternative to a key or signals of various kinds of switches can be input to the body system control unit 12020. The body system control unit 12020 receives these input radio waves or signals, and controls a door lock device, the power window device, the lamps, or the like of the vehicle.

The outside-vehicle information detecting unit 12030 detects information about the outside of the vehicle including the vehicle control system 12000. For example, the outside-vehicle information detecting unit 12030 is connected with an imaging section 12031. The outside-vehicle information detecting unit 12030 makes the imaging section 12031 image an image of the outside of the vehicle, and receives the imaged image. On the basis of the received image, the outside-vehicle information detecting unit 12030 may perform processing of detecting an object such as a human, a vehicle, an obstacle, a sign, a character on a road surface, or the like, or processing of detecting a distance thereto.

The imaging section 12031 is an optical sensor that receives light, and which outputs an electric signal corresponding to a received light amount of the light. The imaging section 12031 can output the electric signal as an image, or can output the electric signal as information about a measured distance. In addition, the light received by the imaging section 12031 may be visible light, or may be invisible light such as infrared rays or the like.

The in-vehicle information detecting unit 12040 detects information about the inside of the vehicle. The in-vehicle information detecting unit 12040 is, for example, connected with a driver state detecting section 12041 that detects the state of a driver. The driver state detecting section 12041, for example, includes a camera that images the driver. On the basis of detection information input from the driver state detecting section 12041, the in-vehicle information detecting unit 12040 may calculate a degree of fatigue of the driver or a degree of concentration of the driver, or may determine whether the driver is dozing.

The microcomputer 12051 can calculate a control target value for the driving force generating device, the steering mechanism, or the braking device on the basis of the information about the inside or outside of the vehicle which information is obtained by the outside-vehicle information detecting unit 12030 or the in-vehicle information detecting unit 12040, and output a control command to the driving system control unit 12010. For example, the microcomputer 12051 can perform cooperative control intended to implement functions of an advanced driver assistance system (ADAS) which functions include collision avoidance or shock mitigation for the vehicle, following driving based on a following distance, vehicle speed maintaining driving, a warning of collision of the vehicle, a warning of deviation of the vehicle from a lane, or the like.

In addition, the microcomputer 12051 can perform cooperative control intended for automated driving, which makes the vehicle to travel automatedly without depending on the operation of the driver, or the like, by controlling the driving force generating device, the steering mechanism, the braking device, or the like on the basis of the information about the outside or inside of the vehicle which information is obtained by the outside-vehicle information detecting unit 12030 or the in-vehicle information detecting unit 12040.

In addition, the microcomputer 12051 can output a control command to the body system control unit 12020 on the basis of the information about the outside of the vehicle which information is obtained by the outside-vehicle information detecting unit 12030. For example, the microcomputer 12051 can perform cooperative control intended to prevent a glare by controlling the headlamp so as to change from a high beam to a low beam, for example, in accordance with the position of a preceding vehicle or an oncoming vehicle detected by the outside-vehicle information detecting unit 12030.

The sound/image output section 12052 transmits an output signal of at least one of a sound and an image to an output device capable of visually or auditorily notifying information to an occupant of the vehicle or the outside of the vehicle. In the example in FIG. 24, as the output device, an audio speaker 12061, a display section 12062, and an instrument panel 12063 are illustrated. The display section 12062 may, for example, include at least one of an on-board display and a head-up display.

Figure 25:
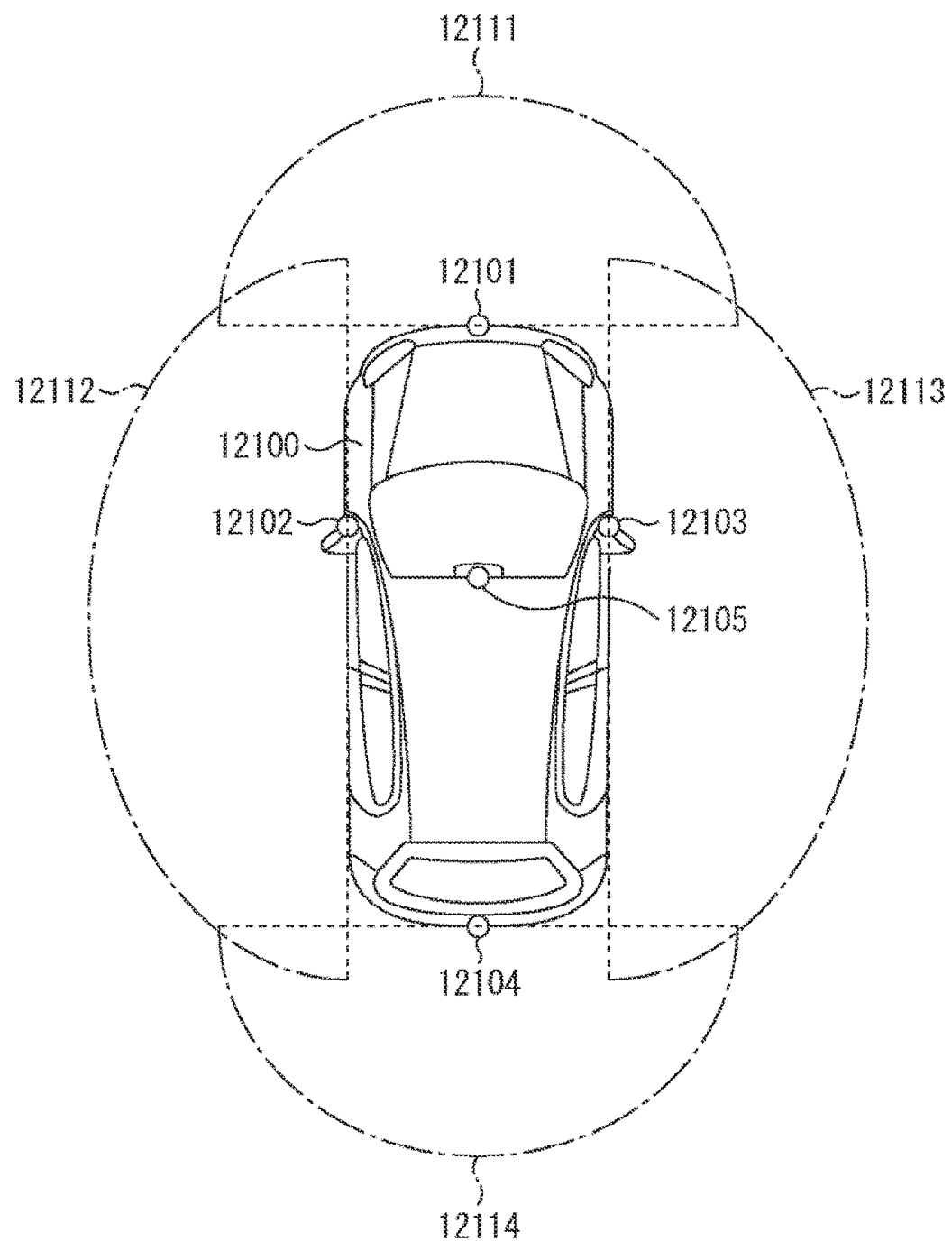
FIG. 25 is an explanatory diagram illustrating an example of the installation positions of an outside-vehicle information detecting section and imaging sections.

FIG. 25 is a diagram showing an example of installation positions of imaging sections 12031.

In FIG. 25, the imaging sections 12031 includes imaging sections 12101, 12102, 12103, 12104, and 12105.

The imaging sections 12101, 12102, 12103, 12104, and 12105 are, for example, disposed at positions on a front nose, sideview mirrors, a rear bumper, and a back door of the vehicle 12100 as well as a position on an upper portion of a windshield within the interior of the vehicle. The imaging section 12101 provided to the front nose and the imaging section 12105 provided to the upper portion of the windshield within the interior of the vehicle obtain mainly an image of the front of the vehicle 12100. The imaging sections 12102 and 12103 provided to the sideview mirrors obtain mainly an image of the sides of the vehicle 12100. The imaging section 12104 provided to the rear bumper or the back door obtains mainly an image of the rear of the vehicle 12100. The imaging section 12105 provided to the upper portion of the windshield within the interior of the vehicle is used mainly to detect a preceding vehicle, a pedestrian, an obstacle, a signal, a traffic sign, a lane, or the like.

Note that, in FIG. 25, an example of the imaging ranges of the imaging sections 12101 to 12104 is illustrated. An imaging range 12111 represents the imaging range of the imaging section 12101 provided to the front nose. Imaging ranges 12112 and 12113 respectively represent the imaging ranges of the imaging sections 12102 and 12103 provided to the sideview mirrors. An imaging range 12114 represents the imaging range of the imaging section 12104 provided to the rear bumper or the back door. A bird's-eye image of the vehicle 12100 as viewed from above is obtained by superimposing image data imaged by the imaging sections 12101 to 12104, for example.

At least one of the imaging sections 12101 to 12104 may have a function of obtaining distance information. For example, at least one of the imaging sections 12101 to 12104 may be a stereo camera constituted of a plurality of imaging elements, or may be an imaging element having pixels for phase difference detection.

For example, the microcomputer 12051 can determine a distance to each three-dimensional object within the imaging ranges 12111 to 12114 and a temporal change in the distance (relative speed with respect to the vehicle 12100) on the basis of the distance information obtained from the imaging sections 12101 to 12104, and thereby extract, as a preceding vehicle, a nearest three-dimensional object in particular that is present on a traveling path of the vehicle 12100 and which travels in substantially the same direction as the vehicle 12100 at a predetermined speed (for example, equal to or more than 0 km/hour). Further, the microcomputer 12051 can set a following distance to be maintained in front of a preceding vehicle in advance, and perform automatic brake control (including following stop control), automatic acceleration control (including following start control), or the like. It is thus possible to perform cooperative control intended for automated driving that makes the vehicle travel automatedly without depending on the operation of the driver or the like.

For example, the microcomputer 12051 can classify three-dimensional object data on three-dimensional objects into three-dimensional object data of a two-wheeled vehicle, a standard-sized vehicle, a large-sized vehicle, a pedestrian, a utility pole, and other three-dimensional objects on the basis of the distance information obtained from the imaging sections 12101 to 12104, extract the classified three-dimensional object data, and use the extracted three-dimensional object data for automatic avoidance of an obstacle. For example, the microcomputer 12051 identifies obstacles around the vehicle 12100 as obstacles that the driver of the vehicle 12100 can recognize visually and obstacles that are difficult for the driver of the vehicle 12100 to recognize visually. Then, the microcomputer 12051 determines a collision risk indicating a risk of collision with each obstacle. In a situation in which the collision risk is equal to or higher than a set value and there is thus a possibility of collision, the microcomputer 12051 outputs a warning to the driver via the audio speaker 12061 or the display section 12062, and performs forced deceleration or avoidance steering via the driving system control unit 12010. The microcomputer 12051 can thereby assist in driving to avoid collision.

At least one of the imaging sections 12101 to 12104 may be an infrared camera that detects infrared rays. The microcomputer 12051 can, for example, recognize a pedestrian by determining whether or not there is a pedestrian in imaged images of the imaging sections 12101 to 12104. Such recognition of a pedestrian is, for example, performed by a procedure of extracting characteristic points in the imaged images of the imaging sections 12101 to 12104 as infrared cameras and a procedure of determining whether or not it is the pedestrian by performing pattern matching processing on a series of characteristic points representing the contour of the object.

When the microcomputer 12051 determines that there is a pedestrian in the imaged images of the imaging sections 12101 to 12104, and thus recognizes the pedestrian, the sound/image output section 12052 controls the display section 12062 so that a square contour line for emphasis is displayed so as to be superimposed on the recognized pedestrian. The sound/image output section 12052 may also control the display section 12062 so that an icon or the like representing the pedestrian is displayed at a desired position.

In the present specification, a system refers to an entire apparatus including a plurality of devices.

Note that the effects described in the present specification are merely examples and are not restrictive, and there may be other effects.

Note that the embodiments of the present technology are not limited to the embodiments described above, and various changes can be made to them without departing from the scope of the present technology.

Note that the present technology may also have the following configurations.

(1)
An imaging device including
a control unit that controls a second imaging element that captures an image at a lower frame rate than a frame rate of a first imaging element, in which
in a case where a synchronization signal supplied from the first imaging element is received, the control unit determines whether or not a current frame is a frame to be decimated, and in a case where the control unit determines that the current frame is not a frame to be decimated, imaging is performed, and in a case where the control unit determines that the current frame is a frame to be decimated, drive for imaging is stopped.

(2)
The imaging device according to (1), in which,
in a case where the synchronization signal is received, auto exposure (AE) setting is updated.

(3)
The imaging device according to (2), in which
second AE setting that is received within a predetermined period of time after the first imaging element receives first AE setting is regarded as being received at the same timing as a timing at which the first AE setting is received.

(4)
An imaging method that is implemented by an imaging device that includes
a control unit that controls a second imaging element that captures an image at a lower frame rate than a frame rate of a first imaging element, in which
in a case where a synchronization signal supplied from the first imaging element is received, the imaging device determines whether or not a current frame is a frame to be decimated, and in a case where determining that the current frame is not a frame to be decimated, the imaging device performs imaging, and in a case where determining that the current frame is a frame to be decimated, the imaging device stops drive for imaging.

(5)
A program to be executed by a computer that controls an imaging device that includes
a control unit that controls a second imaging element that captures an image at a lower frame rate than a frame rate of a first imaging element,
the program causing the computer to perform a process including the steps of:
determining whether or not a current frame is a frame to be decimated, in a case where a synchronization signal supplied from the first imaging element is received; and
performing imaging in a case where the current frame is determined not be a frame to be decimated, and stopping drive for imaging in a case where the current frame is determined to be a frame to be decimated.

(6)
An imaging device including:
a first control unit that controls imaging that is performed by a first imaging element;
a second control unit that controls imaging that is performed by a second imaging element; and
a third control unit that outputs a command for instructing each of the first control unit and the second control unit to switch modes,
in which
the third control unit transmits, to the first control unit, the command including a timing at which setting by the command is reflected, and the third control unit transmits the command to the second control unit.

(7)

The imaging device according to (6), in which
the command is a command with a short data string, the command being associated with a predetermined mode, and
each of the first control unit and the second control unit holds a table in which the command with the short data string is associated with a parameter, and sets the parameter by referring to the table in a case where receiving the command from the third control unit.

(8)

The imaging device according to (7), in which
the table is held by the third control unit, and
when power supply is turned on, the table is supplied from the third control unit to the first control unit and the second control unit, and is held by the first control unit and the second control unit.

(9)

The imaging device according to (7) or (8), in which
the table further refers to another table.

(10)

The imaging device according to any one of (6) to (9), in which
the third control unit transmits the same command to the first control unit and the second control unit.

(11)

An imaging method that is implemented by an imaging device that includes
a first control unit that controls imaging that is performed by a first imaging element,
a second control unit that controls imaging that is performed by a second imaging element, and
a third control unit that outputs a command for instructing each of the first control unit and the second control unit to switch modes,
the imaging method including:
transmitting by the third control unit, the command including a timing at which setting by the command is reflected, to the first control unit; and
transmitting by the third control unit the command to the second control unit.

(12)

A program to be executed by a computer that controls an imaging device that includes
a first control unit that controls imaging that is performed by a first imaging element,
a second control unit that controls imaging that is performed by a second imaging element, and
a third control unit that outputs a command for instructing each of the first control unit and the second control unit to switch modes,
the program causing the computer to perform a process including the steps of:
causing the third control unit to transmit, to the first control unit, the command including a timing at which setting by the command is reflected; and
causing the third control unit to transmit the command to the second control unit.

REFERENCE SIGNS LIST

10 Imaging device
11 Sensor
12 Control unit
13 Signal line
14 Signal line
51 Imaging unit
52 Signal processing unit
53 Synchronization signal generation/output unit
54 Control unit
55 Command reception unit
56 Table holding unit
71 Imaging unit
72 Signal processing unit
73 Synchronization signal reception unit
74 Control unit
75 Command reception unit
76 Table holding unit
91 Command output unit
92 Command holding unit
93 Control unit

The invention claimed is:

1. An imaging device, comprising:
a control unit that controls a second imaging element that captures an image at a lower frame rate than a frame rate of a first imaging element, wherein
in a case where a synchronization signal supplied from the first imaging element is received, the control unit determines whether or not a current frame is a frame to be decimated, and in a case where the control unit determines that the current frame is not a frame to be decimated, imaging is performed, and in a case where the control unit determines that the current frame is a frame to be decimated, drive for imaging is stopped.

2. The imaging device according to claim 1, wherein, in a case where the synchronization signal is received, auto exposure (AE) setting is updated.

3. The imaging device according to claim 2, wherein second AE setting that is received within a predetermined period of time after the first imaging element receives first AE setting is regarded as being received at same timing as a timing at which the first AE setting is received.

4. An imaging method that is implemented by an imaging device that includes
a control unit that controls a second imaging element that captures an image at a lower frame rate than a frame rate of a first imaging element, comprising operation of:
in a case where receiving a synchronization signal supplied from the first imaging element, the imaging device determines whether or not a current frame is a frame to be decimated, and in a case where determining that the current frame is not a frame to be decimated, the imaging device performs imaging, and in a case where determining that the current frame is a frame to be decimated, the imaging device stops drive for imaging.

5. A non-transitory computer-readable medium comprising a program to be executed by a computer that controls an imaging device that includes
a control unit that controls a second imaging element that captures an image at a lower frame rate than a frame rate of a first imaging element,
the program causing the computer to perform a process comprising the steps of:
determining whether or not a current frame is a frame to be decimated, in a case where a synchronization signal supplied from the first imaging element is received; and performing imaging in a case where the current frame is determined not be a frame to be decimated, and stopping drive for imaging in a case where the current frame is determined to be a frame to be decimated.

\* \* \* \* \*